United States Patent
Li et al.

(10) Patent No.: US 10,667,282 B2
(45) Date of Patent: May 26, 2020

(54) UPLINK HOPPING PATTERN MODES FOR HYBRID AUTOMATIC REPEAT REQUEST (HARQ) TRANSMISSIONS

(71) Applicant: QUALCOMM Incorporated, San Diego, CA (US)

(72) Inventors: Chong Li, Weehawken, NJ (US); Jay Kumar Sundararajan, San Diego, CA (US); Jing Jiang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/031,897

(22) Filed: Jul. 10, 2018

(65) Prior Publication Data

US 2019/0021097 A1 Jan. 17, 2019

Related U.S. Application Data

(60) Provisional application No. 62/531,292, filed on Jul. 11, 2017, provisional application No. 62/597,917, filed on Dec. 12, 2017.

(51) Int. Cl.
*H04W 72/12* (2009.01)
*H04B 1/713* (2011.01)
(Continued)

(52) U.S. Cl.
CPC .......... *H04W 72/12* (2013.01); *H04B 1/692* (2013.01); *H04B 1/713* (2013.01); *H04B 1/7143* (2013.01);
(Continued)

(58) Field of Classification Search
CPC .............. H04B 1/7143; H04B 1/692; H04B 2001/6908; H04B 1/713; H04W 72/0413;
(Continued)

(56) References Cited

U.S. PATENT DOCUMENTS 7,417,964 B2 * 8/2008 Cho .................. H04L 5/006
370/210
8,416,835 B2 * 4/2013 Ahn ..................... H04B 1/7143
375/132

(Continued)

OTHER PUBLICATIONS

Chao W., et al., "Performance Evaluation of Grant-Free Transmission for Uplink URLLC Services", 2017 IEEE 85th Vehicular Technology Conference (VTC Spring), IEEE, Jun. 4, 2017 (Jun. 4, 2017), XP033254584, pp. 1-6.
(Continued)

*Primary Examiner* — Man U Phan
(74) *Attorney, Agent, or Firm* — Linda G. Gunderson; Loza & Loza LLP

(57) ABSTRACT

Aspects of the present disclosure provide a mechanism for utilizing uplink hopping patterns for HARQ transmissions. Each hopping pattern may include a sequence of different frequency resources or a sequence of different scrambling sequences for a user equipment (UE) to utilize over time for HARQ transmissions. Each of the hopping patterns may further be associated with a time index mode in which the hopping pattern is applied to time resources such that each time resource within a consecutive sequence of time resources is mapped to a different frequency resource or scrambling sequence. The base station may select a hopping pattern for a particular UE and transmit an indication of the selected hopping pattern to the UE.

44 Claims, 15 Drawing Sheets

(51) Int. Cl.

| | |
|---|---|
| *H04J 13/00* | (2011.01) |
| *H04L 1/18* | (2006.01) |
| *H04B 1/692* | (2011.01) |
| *H04B 1/7143* | (2011.01) |
| *H04W 72/04* | (2009.01) |
| *H04B 1/69* | (2011.01) |

(52) U.S. Cl.
CPC ........ *H04J 13/0074* (2013.01); *H04L 1/1819* (2013.01); *H04W 72/042* (2013.01); *H04W 72/0413* (2013.01); *H04B 2001/6908* (2013.01)

(58) Field of Classification Search
CPC ... H04W 72/042; H04W 72/12; H04W 72/04; H04J 13/0074; H04L 1/1819
USPC .......................................................... 370/329
See application file for complete search history.

(56) References Cited

U.S. PATENT DOCUMENTS

| | | | | |
|---|---|---|---|---|
| 8,687,657 | B2 * | 4/2014 | Ishii ...................... | H04B 1/713 370/503 |
| 8,855,225 | B2 | 10/2014 | Malladi | |
| 9,036,611 | B2 | 5/2015 | Han et al. | |
| 9,282,559 | B2 | 3/2016 | Heo et al. | |
| 9,590,693 | B2 * | 3/2017 | Ahn ..................... | H04B 1/7143 |
| 9,717,076 | B2 | 7/2017 | Park et al. | |
| 9,723,598 | B2 * | 8/2017 | Park ..................... | H04L 1/00 |
| 10,237,859 | B2 * | 3/2019 | Park ..................... | H04L 1/00 |
| 10,264,559 | B2 * | 4/2019 | Park ..................... | H04L 1/00 |
| 10,312,962 | B2 * | 6/2019 | Ro ....................... | H04B 1/7143 |
| 2019/0029030 | A1 * | 1/2019 | Zou ..................... | H04W 72/0446 |
| 2019/0166619 | A1 * | 5/2019 | Takeda ................. | H04W 72/12 |
| 2019/0173619 | A1 * | 6/2019 | Li ........................ | H04L 27/2605 |

OTHER PUBLICATIONS

Fujitsu: "Discussions on HARQ for grant-free UL URLLC", 3GPP Draft, R1-1704481 Discussions on HARQ for Grant-Free UL URLLC Final, 3rd Generation Partnership Project (3GPP), Mobile Competence Centre, 650, Route Des Lucioles, F-06921 Sophia-Antipolis Cedex, vol. RAN WG1, No. Spokane, USA, Apr. 3, 2017-Apr. 7, 2017, Apr. 2, 2017 (Apr. 2, 2017), XP051242625, pp. 1-3, Retrieved from the Internet: URL:http://www.3gpp.org/ftp/Meetings_3GPP_SYNC/RAN1/Docs/ [retrieved on Apr. 2, 2017].

Guangdong Oppo Mobile Telecom: "Uplink Grant-Less Transmission for URLLC", 3GPP Draft, R1-1700571, 3rd Generation Partnership Project (3GPP), Mobile Competence Centre, 650, Route Des Lucioles, F-06921 Sophia-Antipolis Cedex, France vol. RAN WG1, No. Spokane, USA, Jan. 16, 2017-Jan. 20, 2017 Jan. 16, 2017 (Jan. 16, 2017), XP051208101, pp. 1-2, Retrieved from the Internet: URL:http://www.3gpp.org/ftp/Meetings_3GPP_SYNC/RAN1/Docs/ [retrieved on Jan. 16, 2017].

International Search Report and Written Opinion—PCT/US2018/041691—ISA/EPO—dated Oct. 26, 2018.

* cited by examiner

UPLINK HOPPING PATTERN MODES FOR HYBRID AUTOMATIC REPEAT REQUEST (HARQ) TRANSMISSIONS

PRIORITY CLAIM

This application claims priority to and the benefit of Provisional Patent Application No. 62/531,292 filed in the U.S. Patent and Trademark Office on Jul. 11, 2017 and Provisional Patent Application No. 62/597,917, filed in the U.S. Patent and Trademark Office on Dec. 12, 2017, the entire contents of which are incorporated herein by reference as if fully set forth below in their entirety and for all applicable purposes.

TECHNICAL FIELD

The technology discussed below relates generally to wireless communication systems, and more particularly, to hybrid automatic repeat request (HARQ) uplink transmissions in wireless communication systems.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

Next generation (5G) wireless communication networks, such as the New Radio (NR) network, may allow multiple uplink packets to share the same time—frequency resources. For example, in 5G wireless systems that require ultra-reliability and low latency communications (URLLC), e.g., a reliability of less than 1e-5 and a latency of less than 2 ms, instantaneous scheduling request (SR) transmissions may be supported to allow a URLLC user equipment (UE) to transmit an uplink SR as soon as a new packet arrives. As another example, in massive Machine Type Communications (mMTC) 5G wireless systems where a large number of UEs are present, the same uplink time—frequency resources may be granted to multiple UEs. Similarly, in enhanced Mobile Broadband (eMB) 5G wireless systems, multiple UEs may transmit on grant-free (e.g., contention-based) resources or opportunistic resources. In any of these scenarios, collisions may occur between the uplink packets.

If the base station is unable to detect or decode the multiple uplink packets as a result of collisions therebetween, each of the UEs may need to retransmit their uplink packet using, for example, a hybrid automatic repeat request (HARQ) retransmission process. To avoid further collisions, while also meeting the stringent reliability and latency requirements of URLLC, mechanisms for selecting the uplink time—frequency resources utilized in the HARQ retransmission process may be developed.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for utilizing uplink hopping patterns for HARQ transmissions. In some examples, a hopping pattern may include a sequence of different frequency resources for a user equipment (scheduled entity) to utilize over time for HARQ transmissions. In other examples, a hopping pattern may include a sequence of different scrambling sequences in the CDMA domain for a scheduled entity to utilize over time for HARQ transmissions. Each of the hopping patterns may further be associated with a time index mode in which the hopping pattern is applied to time resources such that each time resource within a consecutive sequence of time resources is mapped to a different frequency resource or scrambling sequence. A base station (scheduling entity) may select a hopping pattern for a particular scheduled entity and transmit an indication of the selected hopping pattern to the scheduled entity.

In one aspect of the disclosure, a method is provided for a scheduling entity to communicate with a set of one or more scheduled entities in a wireless communication network. The method includes selecting a hopping pattern from a plurality of hopping patterns for a scheduled entity of the set of one or more scheduled entities to utilize for transmission of an uplink packet, where each of the plurality of hopping patterns includes a respective sequence of different transmission parameters, and each of the different transmission parameters in the sequence of different transmission parameters is mapped to a respective time resource within a consecutive sequence of time resources. The method further includes transmitting an indication of the hopping pattern to the scheduled entity, and receiving an initial transmission and one or more retransmissions of the uplink packet from the scheduled entity based on the hopping pattern.

Another aspect of the disclosure provides a scheduling entity in a wireless communication network. The scheduling entity includes a transceiver for wireless communication with a set of one or more scheduled entities, a memory maintaining a plurality of hopping patterns, and a processor communicatively coupled to the transceiver and the memory. The processor is configured to select a hopping pattern from the plurality of hopping patterns for a scheduled entity of the set of one or more scheduled entities to utilize for transmission of an uplink packet, where each of the plurality of hopping patterns includes a respective sequence of different transmission parameters, and each of the different transmission parameters in the sequence of different transmission parameters is mapped to a respective time resource within a consecutive sequence of time resources. The processor is further configured to transmit an indication of the hopping pattern to the scheduled entity via the transceiver, and receive an initial transmission and one or more retransmissions of the uplink packet from the scheduled entity based on the hopping pattern via the transceiver.

Another aspect provides a scheduling entity for communicating with a set of one or more scheduled entities in a wireless communication network. The scheduling entity includes means for selecting a hopping pattern from a plurality of hopping patterns for a scheduled entity of the set of one or more scheduled entities to utilize for transmission of an uplink packet, where each of the plurality of hopping patterns includes a respective sequence of different transmission parameters, and each of the different transmission parameters in the sequence of different transmission parameters is mapped to a respective time resource within a consecutive sequence of time resources. The scheduling entity further includes means for transmitting an indication of the hopping pattern to the scheduled entity, and means for receiving an initial transmission and one or more retransmissions of the uplink packet from the scheduled entity based on the hopping pattern.

Another aspect of the disclosure provides a non-transitory computer-readable medium storing computer executable code. The non-transitory computer-readable medium includes code for causing a scheduling entity in a wireless communication network to select a hopping pattern from the plurality of hopping patterns for a scheduled entity of the set of one or more scheduled entities to utilize for transmission of an uplink packet, where each of the plurality of hopping patterns includes a respective sequence of different transmission parameters, and each of the different transmission parameters in the sequence of different transmission parameters is mapped to a respective time resource within a consecutive sequence of time resources. The non-transitory computer-readable medium further includes code for causing the scheduling entity to transmit an indication of the hopping pattern to the scheduled entity, and receive an initial transmission and one or more retransmissions of the uplink packet from the scheduled entity based on the hopping pattern.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
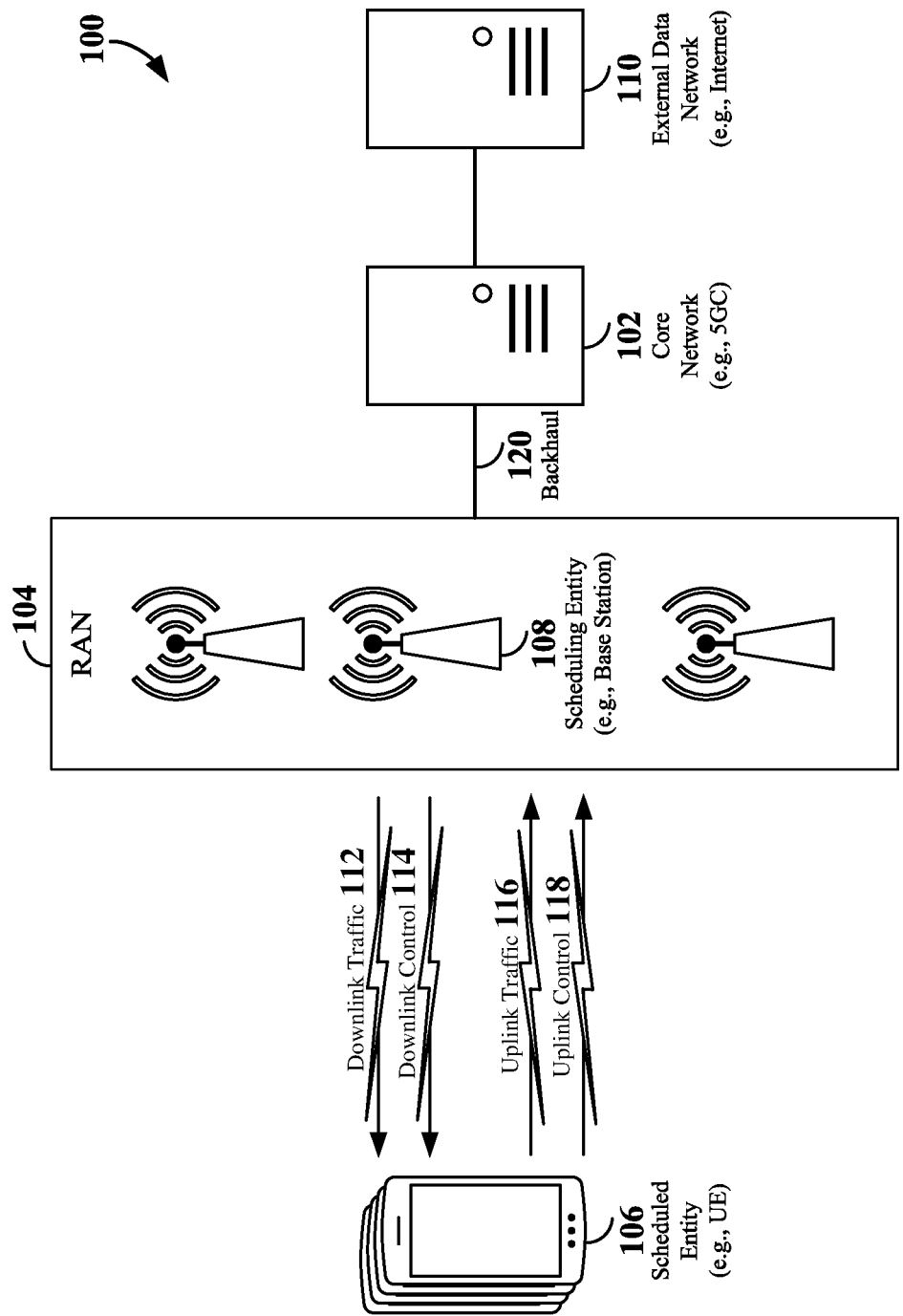
FIG. 1 is a conceptual diagram illustrating an example of a radio access network according to some aspects of the present disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
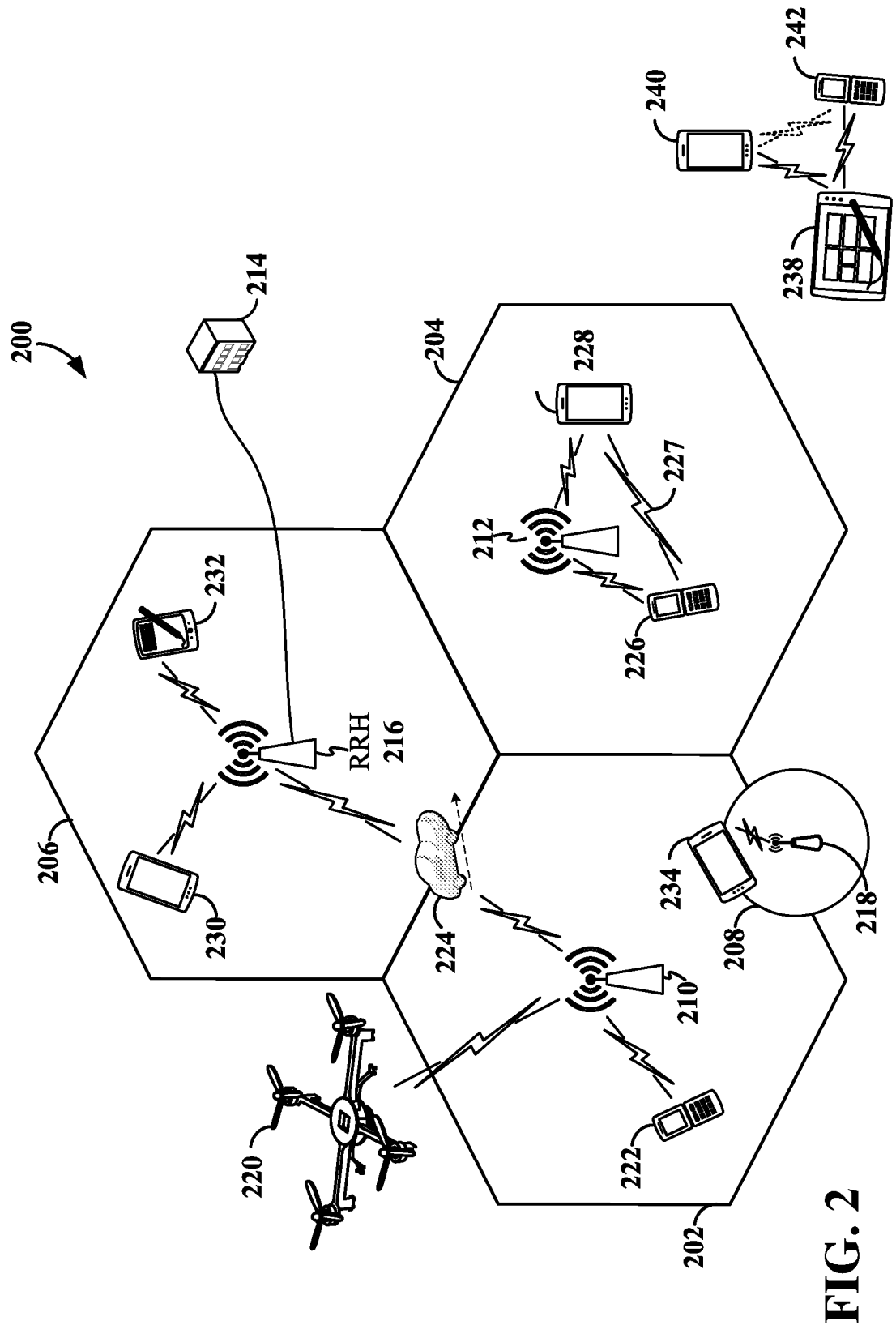
FIG. 2 is a block diagram illustrating an example of a scheduling entity communicating with one or more scheduled entities according to some aspects of the present disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
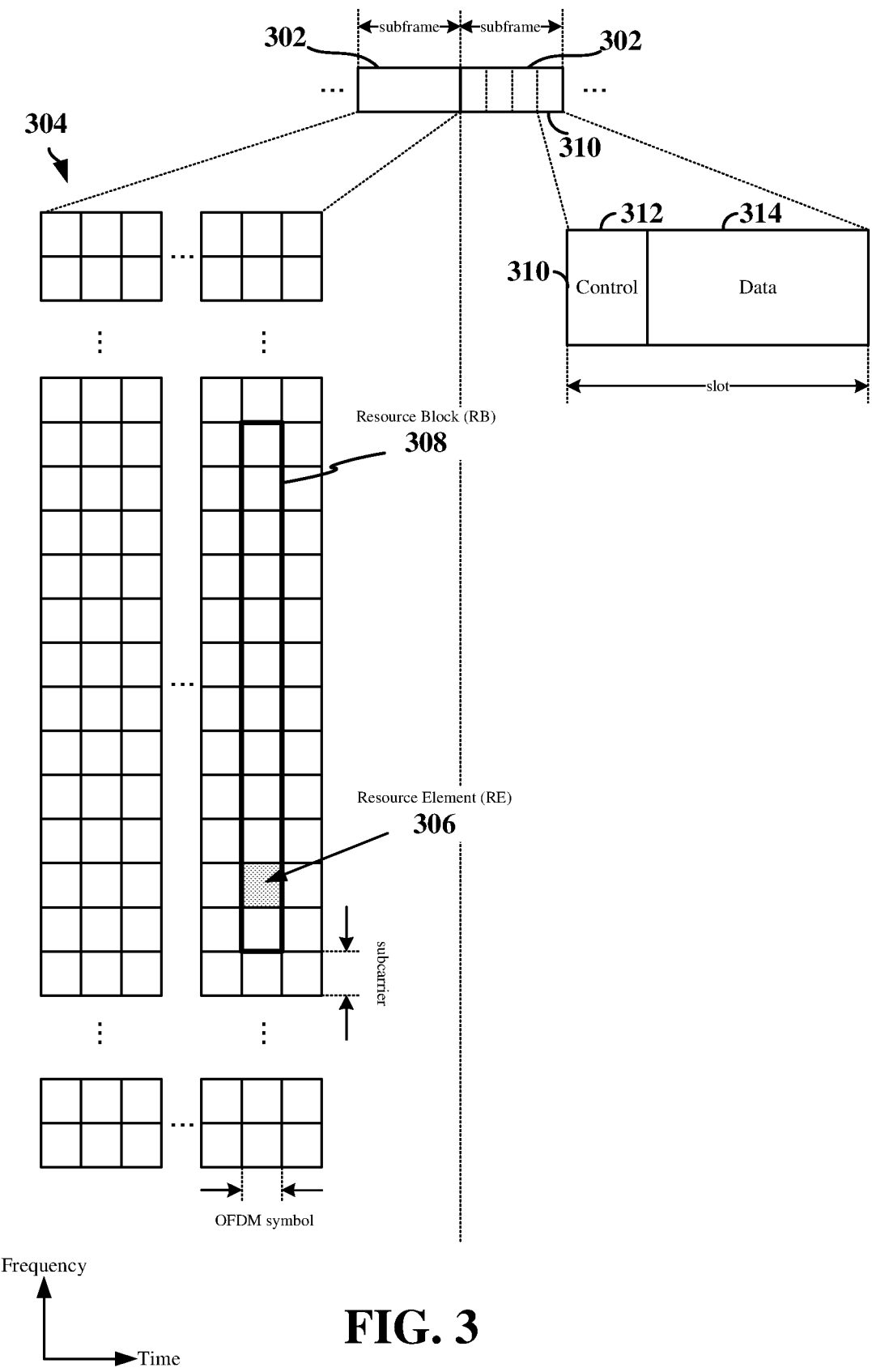
FIG. 3 is a diagram illustrating an example of a resource structure for use in a radio access network according to some aspects of the present disclosure.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG) or sub-band. A set of sub-bands may span the entire bandwidth. Scheduling of UEs (scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks or resource block groups (e.g., groups of sub-carriers and OFDM symbols) may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
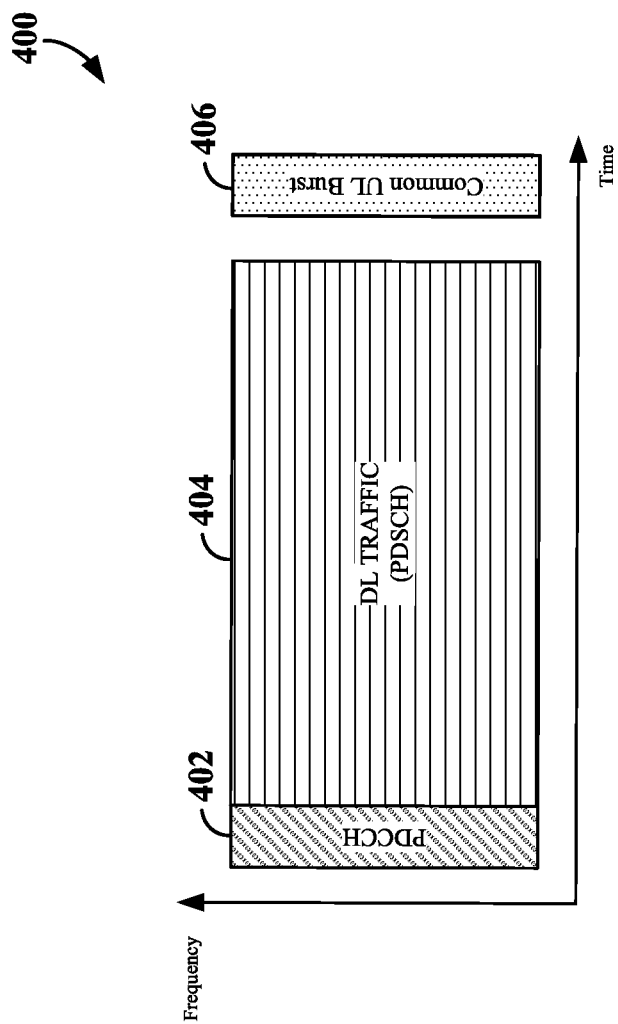
FIG. 4 is a diagram illustrating an example of a downlink (DL)-centric slot according to some aspects of the present disclosure.
Figure 5:
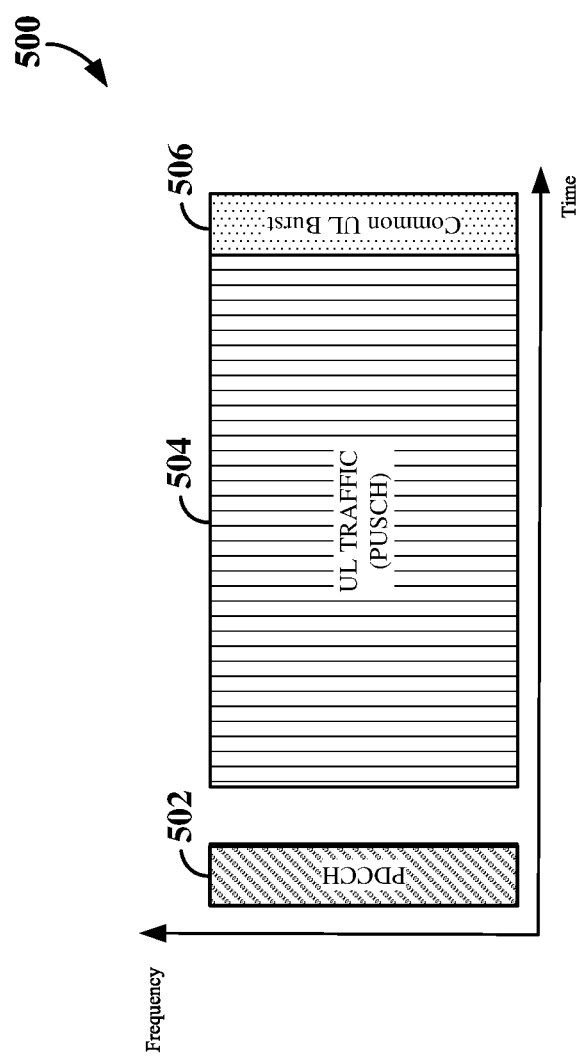
FIG. 5 is a diagram illustrating an example of an uplink (UL)-centric slot according to some aspects of the present disclosure.

According to an aspect of the disclosure, one or more slots may be structured as self-contained slots. For example, FIGS. 4 and 5 illustrate two example structures of self-contained slots 400 and 500. The self-contained slots 400 and/or 500 may be used, in some examples, in place of the slot 310 described above and illustrated in FIG. 3.

FIG. 4 is a diagram illustrating an example of a downlink (DL)-centric slot 400 according to some aspects of the disclosure. The nomenclature DL-centric generally refers to a structure wherein more resources are allocated for transmissions in the DL direction (e.g., transmissions from the scheduling entity 108 to the scheduled entity 106). In the example shown in FIG. 4, time is illustrated along a horizontal axis, while frequency is illustrated along a vertical axis. The time—frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 108 (e.g., eNB) to the scheduled entity 106 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the DL burst 402 and/or DL traffic region 404. Non-limiting examples of feedback information may include an ACK signal, a NACK signal, a HARQ process identifier (ID), and/or various other suitable types of information. The UL burst 406 may include additional or alternative information, such as information pertaining to random access channel (RACH) procedures, scheduling requests (SRs) (e.g., within a PUCCH), and various other suitable types of information.

Here, a slot such as the DL-centric slot 400 may be referred to as a self-contained slot when all of the data carried in the DL traffic region 404 is scheduled in the DL burst 402 of the same slot; and further, when all of the data carried in the DL traffic region 404 is acknowledged (or at least has an opportunity to be acknowledged) in the UL burst 406 of the same slot. In this way, each self-contained slot may be considered a self-contained entity, not necessarily requiring any other slot to complete a scheduling-transmission-acknowledgment cycle for any given packet.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)). One of ordinary skill in the art will understand that the foregoing is merely one example of a DL-centric slot and alternative structures having similar features may exist without necessarily deviating from the aspects described herein.

FIG. 5 is a diagram showing an example of an uplink (UL)-centric slot 500 according to some aspects of the disclosure. The nomenclature UL-centric generally refers to a structure wherein more resources are allocated for transmissions in the UL direction (e.g., transmissions from the scheduled entity 106 to the scheduling entity 108). In the example shown in FIG. 5, time is illustrated along a horizontal axis, while frequency is illustrated along a vertical axis. The time—frequency resources of the UL-centric slot 500 may be divided into a DL burst 502, an UL traffic region 504 and an UL burst 506.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 504. The UL traffic region 504 may sometimes be referred to as the payload of the UL-centric slot. The UL traffic region 504 may include the communication resources utilized to communicate UL user data traffic from the scheduled entity 106 (e.g., UE) to the scheduling entity 108 (e.g., eNB). In some configurations, the UL traffic region 504 may be a physical UL shared channel (PUSCH). As illustrated in FIG. 5, the end of the DL burst 502 may be separated in time from the beginning of the UL traffic region 504. This time, separation may sometimes be referred to as a gap, guard period, guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)).

The UL burst 506 in FIG. 5 may be similar to the UL burst 406 described above with reference to FIG. 4. The UL burst 506 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

In next generation (e.g., 5G or NR) wireless communication networks, multiple uplink packets may be transmitted within the same time—frequency resource (e.g., within the same resource blocks). Such uplink packets may be transmitted within the UL traffic region 504 of an UL-centric slot 500 or the UL burst 406 or 506 of a DL-centric 400 or UL-centric slot 500. The uplink packets may contain user data traffic or control information, such as scheduling requests.

For example, in order to meet the requirements of ultra-reliability and low latency communications (URLLC), instantaneous scheduling request (SR) transmissions may be supported to allow a URLLC user equipment (UE) to transmit a SR as soon as a new packet arrives, which may result in a SR packet being transmitted within the same time—frequency resources as another SR packet. As another example, if a large number of UEs are present within a cell, as may be the situation with cells that support massive Machine Type Communication (mMTC), the same uplink time—frequency resources may be granted to two or more UEs for SRs or other control information, such as channel state information (CSI) or feedback information (e.g., ACK/NACK). In addition, some of the time—frequency resources may be grant-free resources that may be utilized for contention-based transmissions, such as random access request transmissions, or opportunistic resources that may be utilized for urgent user data traffic transmissions. Grant-free and opportunistic resources may be utilized by URLLC UEs, mMTC UEs, and enhanced Mobile Broadband (eMBB) UEs.

When two or more uplink packets are transmitted within the same time—frequency resource, a collision may occur between the uplink packets, resulting in the base station (scheduling entity) being unable to detect or decode the uplink packets. In this scenario, each of the UEs may need to retransmit their uplink packet using, for example, a hybrid automatic repeat request (HARQ) retransmission process which may implement chase combining, incremental redundancy, etc. However, since each UE may initiate the retransmission process at substantially the same time (e.g., based on receiving a NACK or timing out), the UEs may again utilize the same time—frequency resources for retransmitting their uplink packets.

In various aspects of the present disclosure, to avoid further collisions, thereby enabling the URLLC requirements to be met, various uplink hopping patterns may be utilized for HARQ transmissions. In some examples, a hopping pattern may include a sequence of different frequency resources for a UE (scheduled entity) to utilize over time for HARQ transmissions. In other examples, a hopping pattern may include a sequence of different scrambling sequences for CDMA transmissions for a UE to utilize over time for HARQ transmissions. In still other examples, a hopping pattern may include a sequence of different time resources for a UE to utilize over time for HARQ transmissions. Each of the hopping patterns may further be associated with a particular mode of operation. In some examples, the mode may be a HARQ transmission index mode in which the hopping pattern is applied to each HARQ transmission. In other examples, the mode may be a time index mode in which the hopping pattern is applied to time resources (e.g., units of time).

In various aspects of the present disclosure, each UE may be provided with a unique hopping pattern for a particular mode of operation to reduce the potential for collisions with other UEs. For example, each UE associated with the HARQ transmission index mode may be provided with a different hopping pattern than the other UEs associated with the HARQ transmission index mode. Similarly, each UE associated with the time index mode may be provided with a different hopping pattern than the other UEs associated with the time index mode. In some examples, all of the hopping patterns for both the HARQ transmission index mode and time index mode may be unique to each UE. For example, the hopping pattern for a particular UE may be derived from the identity of the UE (e.g., UEID).

Figure 6:
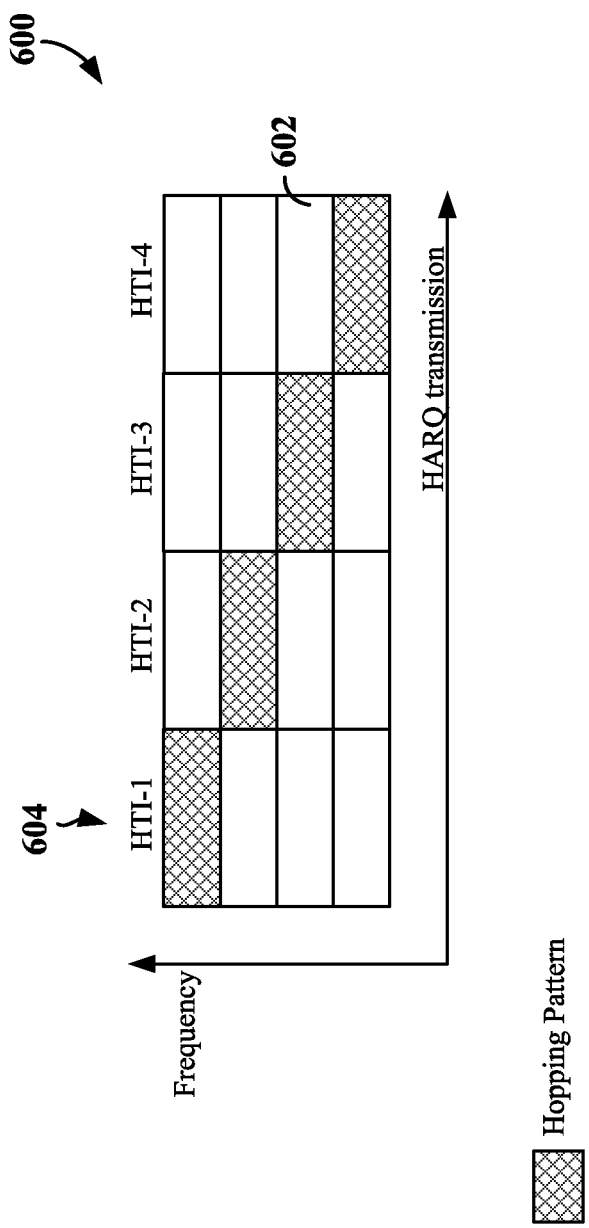
FIG. 6 is a diagram illustrating an example of a hopping pattern utilized in a HARQ transmission index mode according to some aspects of the present disclosure.

FIG. 6 is a diagram illustrating an example of a hopping pattern 600 utilized in the HARQ transmission index mode. In the example shown in FIG. 6, frequency is illustrated along a vertical axis, while the HARQ transmission 604 is illustrated along a horizontal axis. For simplicity, frequencies are shown grouped into frequency resource blocks 602, where each frequency resource block 602 contains any suitable number of consecutive sub-carriers in the frequency domain. As can be seen in FIG. 6, within a particular HARQ transmission 604, each of the frequency resource blocks 602 includes different frequencies (sub-carriers). However, the frequency resource blocks 602 may not be contiguous. The HARQ transmissions 604 include an initial transmission of an uplink packet, along with one or more retransmissions of the uplink packet, where the one or more retransmissions may implement chase combining, incremental redundancy, etc. In some examples, the uplink packet may include a scheduling request or other grant-free or opportunistic transmission within a physical uplink shared channel (PUSCH) or a physical uplink control channel (PUCCH) (e.g., random access request, channel state information, ACK/NACK, etc.).

The hopping pattern 600 illustrated in FIG. 6 provides that each HARQ transmission utilizes different frequency resources. Thus, each frequency resource (e.g., each frequency resource block 602) is mapped to a different HARQ transmission 604. For example, a first HARQ transmission (e.g., an initial transmission of an uplink packet) may utilize first frequency resources (e.g., the frequencies within a first frequency resource block 602), while each subsequent HARQ transmission (e.g., each retransmission of the uplink packet) may utilize different frequency resources (e.g., the frequencies within different frequency resource blocks 602). Thus, the frequency resources utilized to transmit the uplink packet switch with each HARQ transmission.

Any suitable number of HARQ transmissions 604 may be included in the hopping pattern 600, and each HARQ transmission 604 may be indexed (numbered) within the hopping pattern 600 to differentiate the HARQ transmissions 604 within the hopping pattern and map the frequency resources to each HARQ transmission index. In the example shown in FIG. 6, each HARQ transmission is designated by a particular HARQ transmission index (e.g., HTI-1, HTI-2, HTI-3, or HTI-4) indicating the HARQ transmission index number of the HARQ transmission, where HTI-1 corresponds to the initial transmission and HTI-2 through HTI-4 correspond to HARQ retransmissions. Although four HARQ transmissions 604 are shown in FIG. 6, it should be understood that any suitable number of HARQ transmissions may be included in the hopping pattern 600. In addition, if additional HARQ transmissions 604 are necessary beyond the number included in the hopping pattern 600, the hopping pattern 600 may repeat any suitable number of times.

Although the hopping pattern shown in FIG. 6 reduces the likelihood of collisions between UEs, if the base station (scheduling entity) does not detect the initial (first) HARQ transmission, subsequent detections of the second, third, and fourth HARQ transmissions may also fail due to the mismatched frequency resource detection locations between the HARQ transmissions. For example, if the base station is unaware of the first HARQ transmission (e.g., as a result of a collision), the base station may continue to attempt to detect the first HARQ transmission within the first frequency resource block when the UE transmits the second HARQ transmission within the second frequency resource block. In some examples, to ensure the base station is able to detect the second and all subsequent HARQ transmissions when the base station misses the first HARQ transmission, the base station may blind decode over all frequency resource blocks 602 within the hopping pattern 600 to locate the HARQ transmission and decode the uplink packet.

Figure 7:
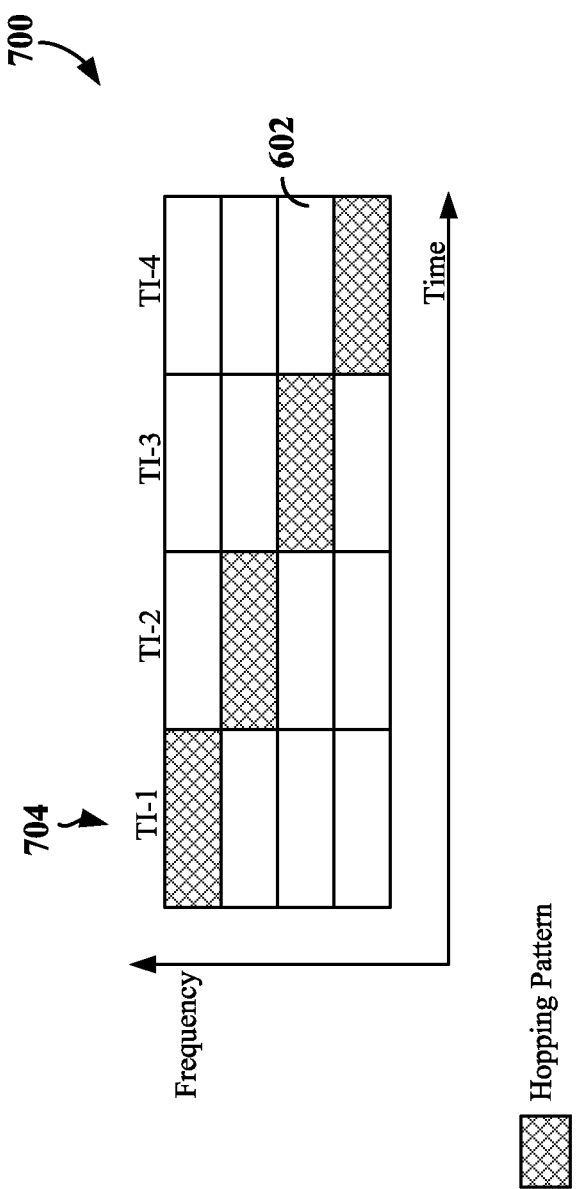
FIG. 7 is a diagram illustrating an example of a hopping pattern utilized in a time index mode according to some aspects of the present disclosure.

FIG. 7 is a diagram illustrating an example of a hopping pattern 700 utilized in the time index mode. In the example shown in FIG. 7, frequency is illustrated along a vertical axis, while time is illustrated along a horizontal axis. As in FIG. 6, frequencies are shown grouped into frequency resource blocks 602, where each frequency resource block 602 contains any suitable number of consecutive sub-carriers in the frequency domain. Along the time axis, time is shown divided into consecutive time resources 704 based on any suitable unit of time. Thus, all of the time resources 704 may be equal, such that each time resource 704 includes the same duration of time. For example, each time resource 704 may include a symbol (e.g., OFDM symbol), a mini-slot, or a slot. In addition, each of the time resources 704 may be designated by a particular time index (e.g., TI-1, TI-2, TI-3, or TI-4) indicating a time resource number of the time resource 704 within the consecutive sequence of time resources.

The hopping pattern 700 illustrated in FIG. 7 provides that each time resource 704 utilizes different frequency resources (e.g., a different frequency resource block 602). Thus, each frequency resource block 602 is mapped to a different time resource 704 within the hopping pattern 700. Any suitable number of time resources 704 may be included in the hopping pattern 700, and each time resource 704 may be indexed (numbered) within the hopping pattern 700 to differentiate the time resources 704 within the hopping pattern and map the frequency resources to each time index (e.g., TI-1 through TI-4). Therefore, the particular frequency resources to utilize for transmission of an uplink packet within a particular time resource 704 may be determined based on the time index of the particular time resource in the hopping pattern 700. Although four time indexes are shown in FIG. 7, it should be understood that any suitable number of time indexes may be included in the hopping pattern 700.

In addition, the hopping pattern 700 may continuously repeat over time to perpetually map frequency resources to time resources. In some examples, the hopping pattern 700 as a whole may represent a larger unit of time. For example, the hopping pattern 700 may represent a slot and each time index may correspond to a particular symbol or mini-slot within the slot. As another example, the hopping pattern 700 may represent a frame and each time index may correspond to a particular symbol, mini-slot, or slot within the frame. In some examples, the current time index in the hopping pattern 700 is maintained at both the base station and UE. In other examples, the current time index may be signaled within downlink control information, periodically, or aperiodically.

Based on the hopping pattern selected for a particular UE, the UE may identify the frequency resources to utilize for a HARQ transmission. For example, a first HARQ transmission (e.g., an initial transmission of an uplink packet) may occur at a first time index (e.g., TI-1) in the hopping pattern 700, and therefore, the UE may utilize the frequency resources within the first frequency resource block 602 associated with the first time index for the first HARQ transmission. A second HARQ transmission (e.g., a retransmission of the uplink packet) may occur at a second time index (e.g., TI-2) within the hopping pattern 700, which may be a different time index than the first time index or the same time index if the hopping pattern has repeated since the first HARQ transmission, and the UE may utilize the frequency resources within the frequency resource block 602 associated with the second time index for the second HARQ transmission. Since each hopping pattern 700 is unique to a particular UE within a cell, if the base station fails to detect the first HARQ transmission due to a collision, the likelihood of the second HARQ transmission and/or subsequent HARQ transmissions failing due to collisions is reduced. In addition, since the frequency resources (frequency resource blocks 602) are mapped to time resources 704, the base station is able to locate and detect the HARQ transmission based on the known frequency resource location for that time resource. Therefore, if the base station misses the first HARQ transmission, the base station is able to detect the second and all subsequent HARQ transmissions from the known frequency resource locations.

Figure 8:
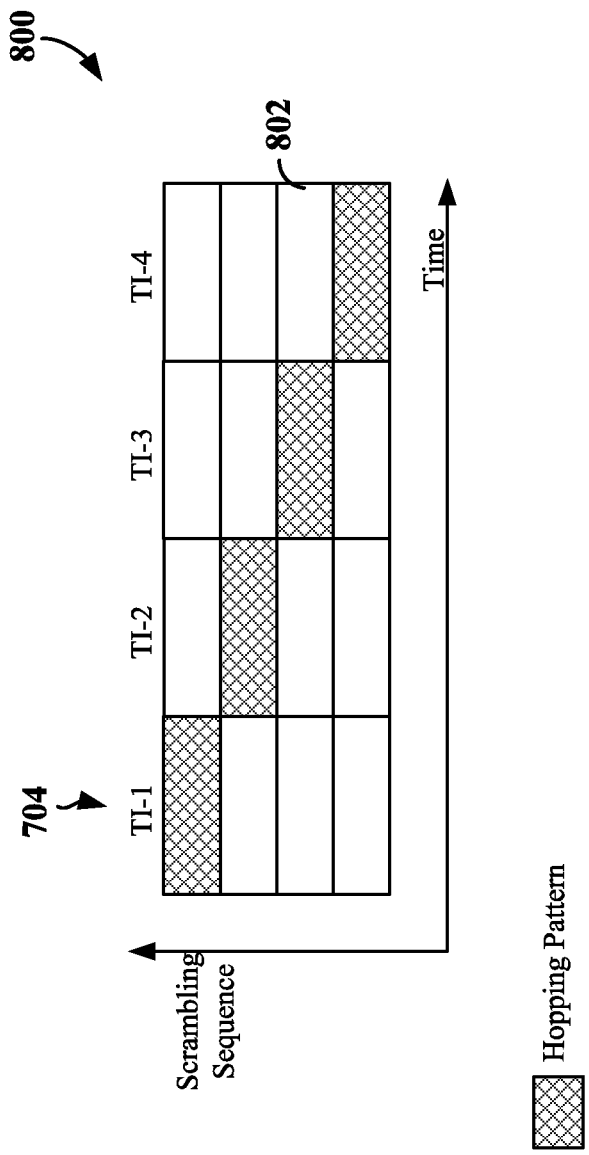
FIG. 8 is a diagram illustrating another example of a hopping pattern utilized in a time index mode according to some aspects of the present disclosure.

FIG. 8 is a diagram illustrating another example of a hopping pattern 800 utilized in the time index mode. In the example shown in FIG. 8, a scrambling sequence is illustrated along a vertical axis, while time is illustrated along a horizontal axis. Each box along the vertical axis represents a different scrambling sequence 802 that may be utilized by a UE to scramble the uplink packet when implementing CDMA. If multiple uplink packets are received by a base station within the same time—frequency resources, the base station may detect and differentiate each of the uplink packets based on their respective scrambling sequences. Along the horizontal axis, time is shown divided into consecutive time resources 704 again based on any suitable unit of time. Thus, all of the time resources are equal, such that each time resource includes the same amount of time. For example, each time resource 704 may include a symbol (e.g., OFDM symbol), a mini-slot or a slot. In addition, each of the time resources 704 may be designated by a particular time index (e.g., TI-1, TI-2, TI-3, or TI-4) indicating a time resource number of the time resource 704 within the consecutive sequence of time resources.

The hopping pattern 800 illustrated in FIG. 8 provides that each time resource 704 utilizes a different scrambling sequence 802. Thus, each scrambling sequence 802 is mapped to a different time resource 704 within the hopping pattern 800. Any suitable number of time resources 704 may be included in the hopping pattern 800, and each time resource 704 may be indexed (numbered) within the hopping pattern 800 to differentiate the time resources within the hopping pattern and map the scrambling sequences 802 to each time index. Therefore, the particular scrambling sequence to utilize for transmission of an uplink packet within a particular time resource 704 may be determined based on the time index of the particular time resource 704 in the hopping pattern 800. Although four time indexes are shown in FIG. 8, it should be understood that any suitable number of time indexes may be included in the hopping pattern 800.

In addition, the hopping pattern 800 may continuously repeat over time to perpetually map scrambling sequences 802 to time resources 704. In some examples, the hopping pattern 800 as a whole may represent a larger unit of time. For example, the hopping pattern 800 may represent a slot and each time index may correspond to a particular symbol or mini-slot within the slot. As another example, the hopping pattern 800 may represent a frame and each time index may correspond to a particular symbol, mini-slot, or slot within the frame. In some examples, the current time index in the hopping pattern 800 is maintained at both the base station and UE. In other examples, the current time index may be signaled within downlink control information, periodically, or aperiodically.

Based on the hopping pattern selected for a particular UE, the UE may identify the scrambling sequence 802 to utilize for a HARQ transmission. For example, a first HARQ transmission (e.g., an initial transmission of an uplink packet) may occur at a first time index (e.g., TI-1) in the hopping pattern 800, and therefore, the UE may utilize the first scrambling sequence 802 associated with the first time index for the first HARQ transmission. A second HARQ transmission (e.g., a retransmission of the uplink packet) may occur at a second time index (e.g., TI-2) within the hopping pattern 800, which may be a different time index than the first time index or the same time index if the hopping pattern has repeated since the first HARQ transmission, and the UE may utilize the scrambling sequence 802 associated with the second time index for the second HARQ transmission. Since each hopping pattern 800 is unique to a particular UE within a cell, if the base station fails to detect the first HARQ transmission due to a collision, the likelihood of the second HARQ transmission and subsequent HARQ transmissions failing due to collisions is reduced. In addition, since the scrambling sequences 802 are mapped to time resources 704, and assuming the scrambling sequences are known, the base station is able to locate and decode the HARQ transmission based on the known scrambling sequence for that time. Therefore, if the base station misses the first HARQ transmission, the base station may be able to decode the second and all subsequent HARQ transmissions from the known scrambling sequences.

Figure 9:
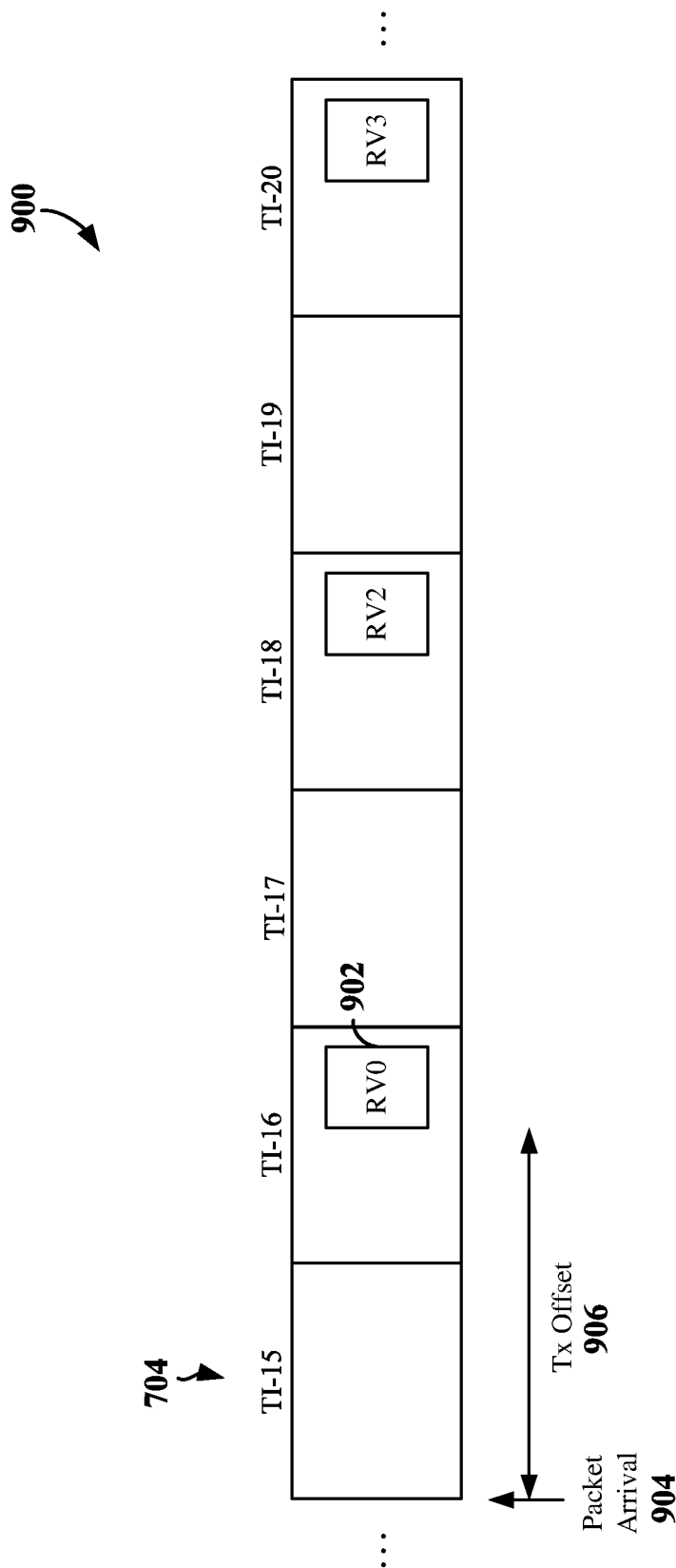
FIG. 9 is a diagram illustrating another example of a hopping pattern utilized in a HARQ transmission index mode according to some aspects of the present disclosure.

FIG. 9 is a diagram illustrating an example of a hopping pattern 900 utilized in the HARQ transmission index mode. In the example shown in FIG. 9, a plurality of time resources 704 are illustrated, each having a same duration of time corresponding to any suitable unit of time. For example, each time resource 704 may include a symbol (e.g., OFDM symbol), a mini-slot, or a slot. Each of the time resources 704 may be designated by a particular time index indicating a number of the time resource 704 within a consecutive sequence of time resources 704. In the example shown in FIG. 9, the time resources 704 may correspond to mini-slots within a sequence of mini-slots, with only mini-slots fifteen through twenty (i.e., TI-15, TI-16, TI-17, TI-18, TI-19, or TI-20) being illustrated, for simplicity.

The hopping pattern 900 illustrated in FIG. 9 provides that each HARQ transmission utilizes different time resources 704. Thus, each HARQ transmission for a particular UE is mapped to a different time resource. In some examples, the hopping pattern 900 may follow a redundancy version (RV) pattern of HARQ transmissions, where each RV in the RV pattern may be identified by an RV identifier (RV ID) corresponding to the HARQ transmission index. In the example shown in FIG. 9, the RV pattern may be represented as {RV0, RV2, RV3, RV1}. Thus, the UE may transmit an initial transmission or initial redundancy version (RV0) of an uplink packet 902, followed by a second redundancy version (RV2) of the uplink packet, a third redundancy version (RV3) of the uplink packet, and a first redundancy version (RV1) of the uplink packet. Each RV may include a different combination of information bits and/or parity bits, depending on the encoding process utilized.

Based on the RV pattern implemented by the UE, the base station may assign a time index rule to the UE. The time index rule maps the RV pattern to time resources 704 based on the time indexes of the time resources. In the example shown in FIG. 9, the time index rule may be represented as {8n, 8n+2, 8n+4, 8n+6} for RV pattern {RV0, RV2, RV3, RV1}. Thus, RV0 may be transmitted within a mini-slot having a time index equal to 8n, where n=1, 2, 3, etc. In the example shown in FIG. 9, the initial redundancy version (RV0) may be transmitted within the mini-slot having a time index of 16 (e.g., the sixteenth mini-slot in the sequence of mini-slots) since the time index of 16 is divisible by 8 without a remainder. Similarly, the second redundancy version (RV2) may be transmitted within the mini-slot having a time index of 18 since when the time index of 18 is divided by 8, there is a remainder of 2. Likewise, the third redundancy version may be transmitted within the mini-slot having a time index of 20 since when the time index of 20 is divided by 8, there is a remainder of 4. In addition, although not shown, the first redundancy version may be transmitted within the mini-slot having a time index of 22 since when the time index of 22 is divided by 8, there is a remainder of 6.

To align the time index with the HARQ transmission (redundancy version), in some examples, a transmit (Tx) offset 906 may be implemented for one or more of the HARQ transmissions. For example, if an initial redundancy version of an uplink packet 902 arrives at the UE in mini-slot fifteen (designated by packet arrival 904), the UE may delay the initial redundancy version (RV0) of the uplink packet 902 until mini-slot sixteen (designated by TX offset 906) based on the time index rule assigned to the UE. In some examples, the uplink packet 902 may include a scheduling request or other grant-free or opportunistic transmission within a physical uplink shared channel (PUSCH) or a physical uplink control channel (PUCCH) (e.g., random access request, channel state information, ACK/NACK, etc.).

It should be understood that any suitable number of HARQ transmissions may be included in the hopping pattern 900 (e.g., which may follow the RV pattern). In addition, the time index may repeat based on the network configuration of OFDM symbol numbers, mini-slot numbers and/or slot/subframe numbers.

Figure 10:
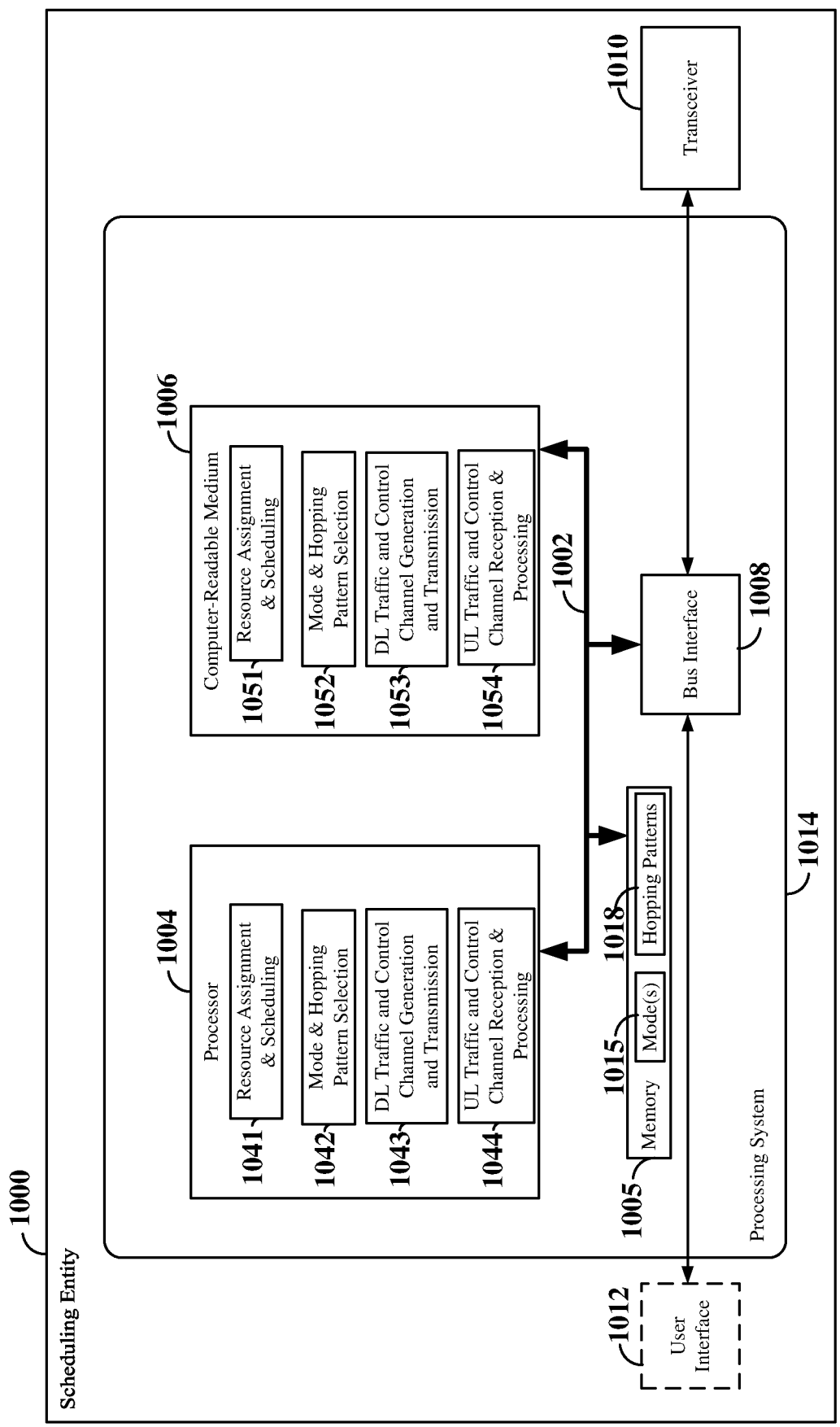
FIG. 10 is a block diagram illustrating an example of a hardware implementation for a scheduling entity employing a processing system according to some aspects of the present disclosure.

FIG. 10 is a conceptual diagram illustrating an example of a hardware implementation for an exemplary scheduling entity 1000 employing a processing system 1014. For example, the scheduling entity 1000 may be a next generation (5G) base station as illustrated in any one or more of FIGS. 1 and 2. In another example, the scheduling entity 1000 may be a user equipment (UE) as illustrated in any one or more of FIGS. 1 and 2.

The scheduling entity 1000 may be implemented with a processing system 1014 that includes one or more processors 1004. The term "processor" or "processors" may be used herein according to the structural meaning thereof. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes described herein. The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). Depending upon the nature of the apparatus, a user interface 1012 (e.g., keypad, display, speaker, microphone, joystick) may also be provided. Of course, such a user interface 1012 is optional, and may be omitted in some examples, such as a base station.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. In some examples, the computer-readable medium 1006 may be integrated with the memory 1005.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. In some examples, the circuitry may be included within a general purpose processor. In other examples, the circuitry may be specialized circuitry configured to perform the various functions. For example, the processor 1004 may include resource assignment and scheduling circuitry 1041, configured to generate, schedule, and modify a resource assignment or grant of time—frequency resources (e.g., a set of one or more resource elements). For example, the resource assignment and scheduling circuitry 1041 may schedule time—frequency resources within a plurality of time division duplex (TDD) and/or frequency division duplex (FDD) subframes, slots, and/or mini-slots to carry user data traffic and/or control information to and/or from multiple UEs (scheduled entities). The resource assignment and scheduling circuitry 1041 may further operate in coordination with resource assignment and scheduling software 1051.

The processor 1004 may further include mode and hopping pattern selection circuitry 1042, configured to select a respective mode of operation and a respective hopping pattern for one or more scheduled entities (UEs) within a cell served by the scheduling entity 1000. In some examples, the respective mode and hopping pattern for each scheduled entity may be selected to minimize the likelihood of collisions between uplink packets transmitted by the scheduled entities. Thus, the mode and hopping pattern selection circuitry 1042 may be configured to select a different, unique hopping pattern for each scheduled entity within the cell. In some examples, the hopping pattern may be a function of the identity of the scheduled entity (e.g., UEID). The mode(s) 1015 and associated hopping pattern(s) 1018 may be stored, for example, in memory 1005.

In some examples, the mode(s) 1015 may include both a HARQ transmission index mode in which the selected hopping pattern 1018 is applied to each HARQ transmission and a time index mode in which the selected hopping pattern 1018 is applied to time resources (e.g., units of time). For the HARQ transmission index mode 1015, the available hopping patterns 1018 are each designed to map frequency resources or time resources to HARQ transmissions. In some examples, a given number of frequency resources (e.g., frequency resource blocks) are provided for a particular hopping pattern 1018 based on a given number of HARQ transmissions supported by the hopping pattern 1018, and each frequency resource block is mapped to a different HARQ transmission or index.

For example, within a first hopping pattern 1018, a first frequency resource block may be mapped to a first (initial) HARQ transmission, a second frequency resource block (different than the first frequency resource block) may be mapped to a second HARQ transmission, a third frequency resource block (different than the first and second frequency resource blocks) may be mapped to a third HARQ transmission, and a fourth frequency resource block (different than the first, second, and third frequency resource blocks) may be mapped to a fourth HARQ transmission. As another example, within a second hopping pattern 1018, the first frequency resource block may be mapped to the first HARQ transmission, the third frequency resource block may be mapped to the second HARQ transmission, the fourth frequency resource block may be mapped to the third HARQ transmission, and the second frequency resource block may be mapped to the fourth HARQ transmission. Each hopping pattern 1018 may thus map different frequency resources to at least some of the HARQ transmission indexes.

In addition, the hopping patterns 1018 may include different frequency resources and/or different numbers of frequency resources. For example, a third hopping pattern 1018 may include the first, second, third, and fourth frequency resource blocks, but may also include a fifth frequency resource block not included in the first and second hopping patterns for mapping to an additional HARQ transmission.

It should be understood that any suitable number of frequency resources/HARQ transmissions may be included in each hopping pattern 1018. In addition, if a scheduled entity assigned to a particular hopping pattern 1018 requires additional HARQ transmissions beyond the number included in the assigned hopping pattern 1018, the scheduled entity may repeat the assigned hopping pattern any suitable number of times.

In some examples, a different time index rule may be assigned to each scheduled entity to map HARQ transmissions for each scheduled entity to different time resources. In addition, the time index rules may be assigned to scheduled entities based on the RV patterns implemented by the scheduled entities. Thus, the hopping pattern 1018 selected for a particular scheduled entity may follow the RV pattern of that scheduled entity to enable the scheduling entity 1000 to identify the RV ID based on the time index of the OFDM symbol, slot, or mini-slot within which the HARQ transmission is received from the scheduled entity.

For the time index mode, the available hopping patterns 1018 are each designed to map either frequency resources or scrambling sequences (for CDMA transmissions) to time resources (e.g., units of time). In some examples, each time resource may include a symbol (e.g., OFDM symbol), a mini-slot or a slot. In some examples, a given number of frequency resources (e.g., frequency resource blocks) or scrambling sequences are provided for a particular hopping pattern 1018 based on a given number of time resources (e.g., a number of consecutive time intervals, each representing the same unit of time) supported by the hopping pattern 1018, and each frequency resource block or scrambling sequence is mapped to a different time resource.

For example, within a first hopping pattern 1018 of the time index mode, a first frequency resource block or scrambling sequence may be mapped to a first time resource, a second frequency resource block or scrambling sequence (different than the first frequency resource block or scrambling sequence) may be mapped to a second time resource occurring immediately after the first time resource, a third frequency resource block or scrambling sequence (different than the first and second frequency resource blocks or scrambling sequences) may be mapped to a third time resource occurring immediately after the second time resource, and a fourth frequency resource block or scrambling sequence (different than the first, second, and third frequency resource blocks or scrambling sequences) may be mapped to a fourth time resource occurring immediately after the third time resource. As another example, within a second hopping pattern 1018 of the time index mode, the first frequency resource block or scrambling sequence may be mapped to the first time resource, the third frequency resource block or scrambling sequence may be mapped to the second time resource, the fourth frequency resource block or scrambling sequence may be mapped to the third time resource, and the second frequency resource block or scrambling sequence may be mapped to the fourth time resource. Each hopping pattern 1018 may thus map different frequency resources or scrambling sequences to at least some of the time resources.

In addition, the hopping patterns 1018 may include different frequency resources or scrambling sequences and/or different numbers of frequency resources or scrambling sequences. For example, a third hopping pattern 1018 of the time index mode may include the first, second, third, and fourth frequency resource blocks or scrambling sequences, but may also include a fifth frequency resource block or scrambling sequence not included in the first and second hopping patterns for mapping to an additional time resource.

Any suitable number of time resources may be included in each hopping pattern 1018, and each time resource may be indexed (numbered) within the hopping pattern to differentiate the time resources within the hopping pattern and map the frequency resources or scrambling sequences to each time index. In examples in which the time resources are slots, a sequence of consecutive, contiguous slots may thus be designated as slot index one, slot index two, slot index three, slot index four, etc., up to the number of slots within the hopping pattern 1018. Therefore, the particular frequency resources or scrambling sequence to utilize within a particular time resource may be determined based on the time index of the particular time resource in the hopping pattern.

In addition, a hopping pattern 1018 assigned to a particular scheduled entity may be utilized by both the scheduling entity 1000 and the scheduled entity to perpetually map frequency resources or scrambling sequences to time resources. In some examples, the hopping pattern 1018 as a whole may represent a larger unit of time. For example, the hopping pattern 1018 may represent a slot and each time index may correspond to a particular symbol or mini-slot within the slot. As another example, the hopping pattern 1018 may represent a frame and each time index may correspond to a particular symbol, mini-slot, or slot within the frame.

The mode and hopping pattern selection circuitry 1042 may select a particular mode 1015 and a particular hopping pattern 1018 associated with the selected mode for a particular scheduled entity based on one or more factors. In some examples, the factors may include the number of scheduled entities within the cell, the traffic requirements of the scheduled entity, and/or the processing capabilities of the scheduling entity 1000. For example, if the number of scheduled entities in the cell is small (e.g., less than a threshold) and the scheduling entity is capable of blind decoding for the uplink packet over all possible frequency blocks in a hopping pattern, the mode and hopping pattern selection circuitry 1042 may select the HARQ transmission mode 1015. As another example, if there are a large number of scheduled entities in the cell and the scheduled entity is a URLLC scheduled entity, the mode and hopping pattern selection circuitry 1042 may select the time index mode 1015. In addition, the mode and hopping pattern selection circuitry 1042 may further select a hopping pattern 1018 within the time index mode 1015 that provides more protected frequency resources in terms of the quality of the link (e.g., high signal-to-noise (SNR) ratio) for the second and other subsequent HARQ transmissions of the uplink packet than the first (initial) HARQ transmission.

The mode and hopping pattern selection circuitry 1042 may further switch the selected mode 1015 and/or hopping pattern 1018 within the selected mode for a particular scheduled entity if the factors change or if the scheduled entity experiences multiple collisions. In addition, multiple modes/hopping patterns may be assigned to a particular scheduled entity, where each combination of a mode/hopping pattern may be utilized for a particular type of traffic. For example, one mode/hopping pattern may be selected for scheduling requests, while another mode/hopping pattern may be selected for PUSCH or PUCCH transmissions. The mode and hopping pattern selection circuitry 1042 may further operate in coordination with mode and hopping pattern selection software 1052.

The processor 1004 may further include downlink (DL) traffic and control channel generation and transmission circuitry 1043, configured to generate and transmit downlink user data traffic and control channels within one or more subframes, slots, and/or mini-slots. The DL traffic and control channel generation and transmission circuitry 1043 may operate in coordination with the resource assignment and scheduling circuitry 1041 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information. For example, the DL traffic and control channel generation and transmission circuitry 1043 may be configured to generate a physical downlink control channel (PDCCH) (or Enhanced PDCCH (ePDCCH)) including downlink control information (DCI). The DL traffic and control channel generation and transmission circuitry 1043 may further be configured to generate a physical downlink shared channel (PDSCH) (or Enhanced PDSCH (ePDSCH)) including downlink user data traffic.

In various aspects of the present disclosure, the DL traffic and control channel generation and transmission circuitry 1043 may further be configured to transmit an indication of a selected mode and a selected hopping pattern for a particular scheduled entity. The indication may be included, for example, within a configuration message, which may in some examples be transmitted as a radio resource control (RRC) message or within downlink control information (DCI). The DL traffic and control channel generation and transmission circuitry 1043 may further operate in coordination with DL traffic and control channel generation and transmission software 1053.

The processor 1004 may further include uplink (UL) traffic and control channel reception and processing circuitry 1044, configured to receive and process uplink control channels and uplink traffic channels from one or more scheduled entities. For example, the UL traffic and control channel reception and processing circuitry 1044 may be configured to receive uplink user data traffic from one or more scheduled entities. In addition, the UL traffic and control channel reception and processing circuitry 1044 may operate in coordination with the resource assignment and scheduling circuitry 1041 to schedule UL user data traffic transmissions, DL user data traffic transmissions and/or DL user data traffic retransmissions in accordance with the received UCI.

In various aspects of the present disclosure, the UL traffic and control channel reception and processing circuitry 1044 may further be configured to receive an uplink packet transmitted from a scheduled entity based on a mode 1015 and hopping pattern 1018 selected for that scheduled entity. In some examples, the uplink packet may include a scheduling request or other grant-free or opportunistic transmission within a physical uplink shared channel (PUSCH) or a physical uplink control channel (PUCCH) (e.g., random access request, channel state information, ACK/NACK, etc.). If the selected mode 1015 includes the HARQ transmission mode and the selected hopping pattern 1018 maps HARQ transmissions to frequency resources, the UL traffic and control channel reception and processing circuitry 1044 may be configured to blind decode over all possible frequency resources within the hopping pattern 1018 assigned to the scheduled entity.

If the selected mode 1015 includes the HARQ transmission mode and the selected hopping pattern 1018 maps HARQ transmissions to time resources, the UL traffic and control channel reception and processing circuitry 1044 may be configured to determine the RV ID from the time index of the time resource utilized by the scheduled entity for the HARQ transmission. In some examples, the current time index may be maintained at both the scheduled entity and the scheduling entity 1000. In other examples, the current time index may be transmitted by the DL traffic and control channel generation and transmission circuitry 1043 within downlink control information (DCI). For example, the current time index may be included in group or common DCI.

If the selected mode 1015 includes the time index mode, the UL traffic and control channel reception and processing circuitry 1044 may be configured to determine a current time index and to utilize the frequency resources or scrambling sequence associated with the current time index within the hopping pattern 1018 assigned to the scheduled entity to detect the uplink packet. In some examples, the current time index for each time index mode hopping pattern 1018 may be maintained at both the scheduled entity and the scheduling entity 1000. In other examples, the current time index may be transmitted by the DL traffic and control channel generation and transmission circuitry 1043 within downlink control information (DCI). In some examples, each time index mode hopping pattern 1018 may include the same time resources (e.g., the same number of time intervals, each having the same duration), and therefore, the current time index may be included in group or common DCI. The UL traffic and control channel reception and processing circuitry 1044 may further operate in coordination with UL traffic and control channel reception and processing software 1054.

The circuitry included in the processor 1004 is provided as non-limiting examples. Other means for carrying out the described functions exists and is included within various aspects of the present disclosure. In some aspects of the disclosure, the computer-readable medium 1006 may store computer-executable code with instructions configured to perform various processes described herein. The instructions included in the computer-readable medium 1006 are provided as non-limiting examples. Other instructions configured to carry out the described functions exist and are included within various aspects of the present disclosure.

Figure 11:
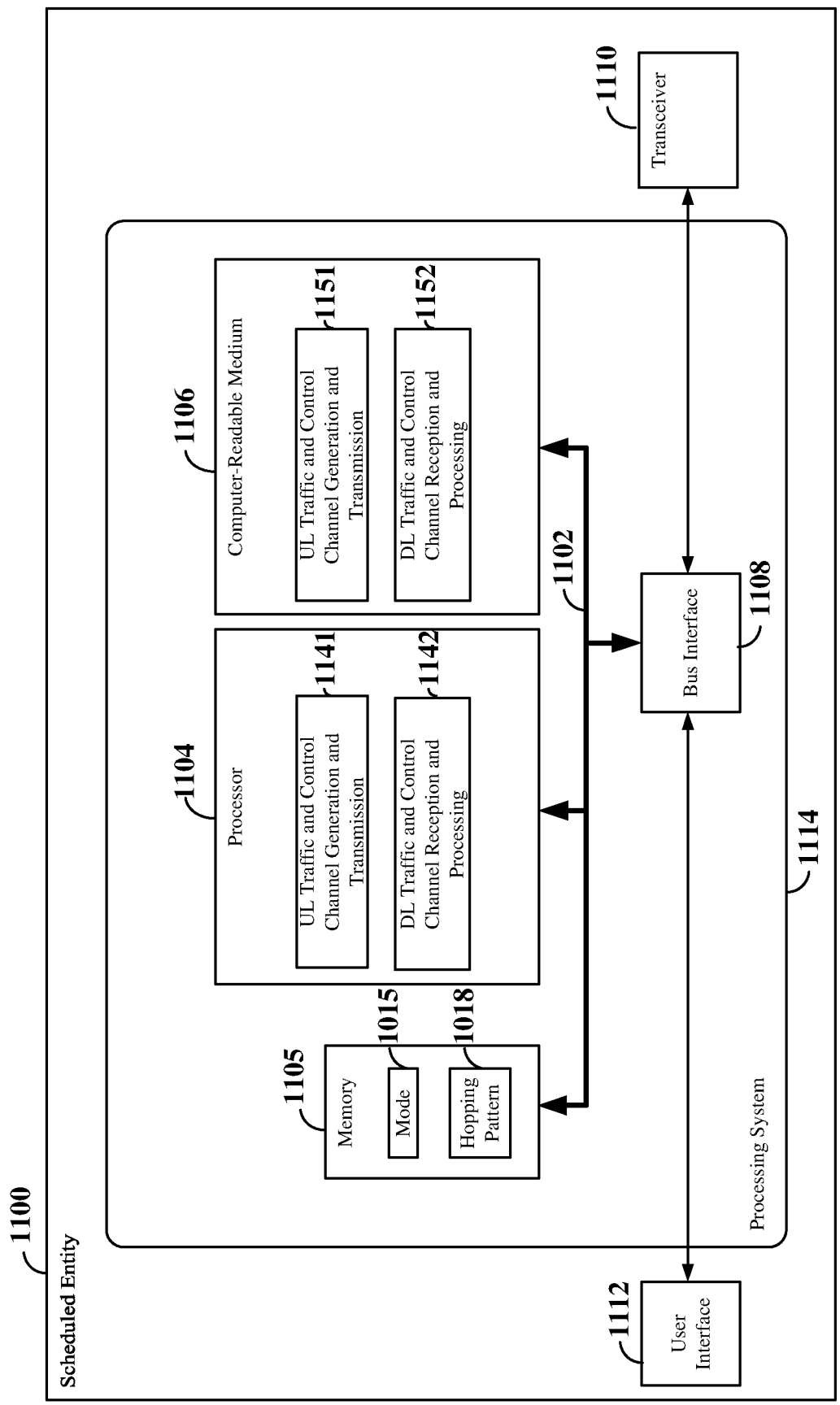
FIG. 11 is a block diagram illustrating an example of a hardware implementation for a scheduled entity employing a processing system according to some aspects of the present disclosure.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1 and 2.

The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 10. That is, the processor 1104, as utilized in a scheduled entity 1100, may be used to implement any one or more of the processes described below.

In some aspects of the disclosure, the processor 1104 may include uplink (UL) traffic and control channel generation and transmission circuitry 1141, configured to generate and transmit uplink control/feedback/acknowledgement information on an UL control channel (e.g., a PUCCH) or UL traffic channel (e.g., a PUSCH). The UL traffic and control channel generation and transmission circuitry 1141 may further be configured to generate and transmit uplink user data traffic on an UL traffic channel (e.g., a PUSCH).

In various aspects of the present disclosure, the UL traffic and control channel generation and transmission circuitry 1141 may further be configured to determine whether an uplink packet to be transmitted is associated with an assigned mode 1015 and hopping pattern 1018. For example, if the uplink packet includes a scheduling request or other user data traffic or control information to be transmitted on a grant-free or opportunistic basis or otherwise on shared time—frequency resources, the UL traffic and control channel generation and transmission circuitry 1141 may identify the mode 1015 and hopping pattern 1018 for the uplink packet. The mode 1015 and hopping pattern 1018 may be stored, for example, in memory 1105. In some examples, multiple modes/hopping patterns 1015/1018 may be stored, each for a different type of traffic.

If the mode 1015 includes the HARQ transmission mode, the UL traffic and control channel generation and transmission circuitry 1141 may further be configured to determine the current HARQ transmission index of the uplink packet (e.g., the current HARQ transmission number of the uplink packet) and identify the frequency resources or time resources mapped to the current HARQ transmission index within the hopping pattern 1018. The UL traffic and control channel generation and transmission circuitry 1141 may then be configured to utilize the identified frequency resources or time resources to transmit the uplink packet.

If the mode 1015 includes the time index mode, the UL traffic and control channel generation and transmission circuitry 1141 may further be configured to determine the current time index within the hopping pattern 1018 and identify the frequency resources or scrambling sequence (for CDMA transmissions) mapped to the current time index. The UL traffic and control channel generation and transmission circuitry 1141 may then be configured to utilize the identified frequency resources or scrambling sequence to transmit the uplink packet.

In some examples, the current time index for each time index mode hopping pattern or HARQ transmission index mode hopping pattern based on time resources may be maintained at both the scheduled entity 1100 and scheduling entity. In other examples, the current time index may be received within downlink control information (DCI). In some examples, each time index mode hopping pattern 1018 may include the same time resources (e.g., the same number of time intervals, each having the same duration), and therefore, the current time index may be included in group or common DCI. The UL traffic and control channel generation and transmission circuitry 1141 may operate in coordination with UL traffic and control channel generation and transmission software 1151.

The processor 1104 may further include downlink (DL) traffic and control channel reception and processing circuitry 1142, configured for receiving and processing downlink user data traffic on a traffic channel, and to receive and process control information on one or more downlink control channels. In various aspects of the present disclosure, the DL traffic and control channel reception and processing circuitry 1142 may be configured to receive the mode(s) 1015 and hopping pattern(s) 1018 assigned to the scheduled entity and store the mode(s) 1015 and hopping pattern(s) 1018 within the memory 1105. For example, the mode(s) 1015 and hopping pattern(s) 1018 may be received via an RRC message or within DCI. The DL traffic and control channel reception and processing circuitry 1142 may further be configured to receive the current time index periodically or aperiodically within DCI. The DL traffic and control channel reception and processing circuitry 1142 may operate in coordination with DL traffic and control channel reception and processing software 1152.

Figure 12:
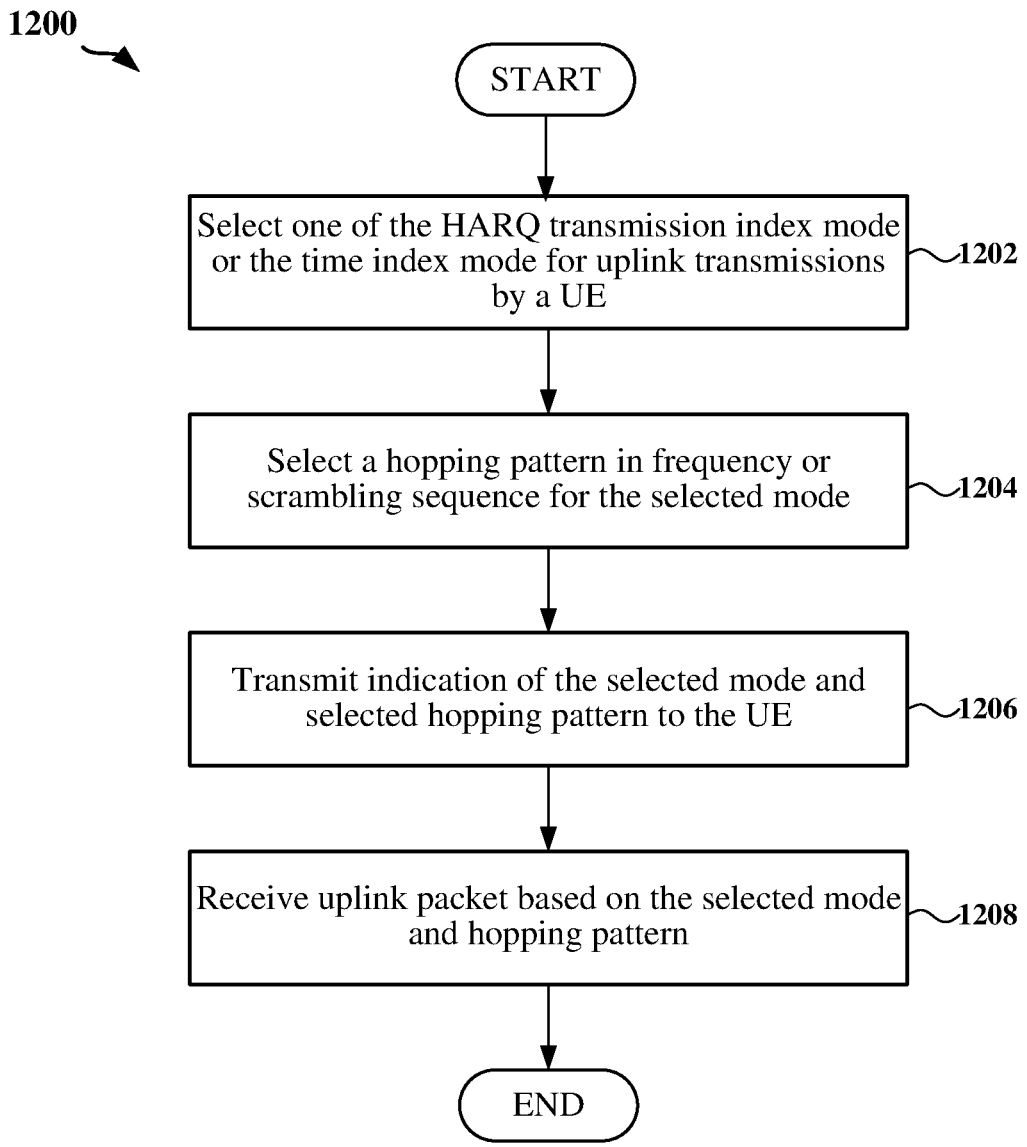
FIG. 12 is a flow chart illustrating an exemplary process for utilizing a hopping pattern for HARQ transmissions in a wireless communication network according to some aspects of the present disclosure.

FIG. 12 is a flow chart illustrating an exemplary process 1200 for utilizing a hopping pattern for HARQ transmissions in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 1000 illustrated in FIG. 10. In some examples, the process 1200 may be carried out by any suitable apparatus or means for carrying out the functions or algorithm described below.

At block 1202, the scheduling entity may select a mode for a scheduled entity to utilize for an uplink packet. The mode may include one of a HARQ transmission index mode or a time index mode. For example, the mode and hopping pattern selection circuitry 1042 shown and described above in reference to FIG. 10 may select the mode for the scheduled entity.

At block 1204, the scheduling entity may select a hopping pattern from a plurality of hopping patterns associated with the selected mode to utilize for the uplink packet. Each of the hopping patterns may include a respective sequence of different transmission parameters for the scheduled entity to utilize over time for an initial transmission and one or more retransmissions of the uplink packet. In some examples, the sequence of different transmission parameters includes a sequence of different frequency resources. In other examples, the sequence of different transmission parameters includes a sequence of different scrambling sequences for CDMA transmissions. In still other examples, the sequence of different transmission parameters includes a sequence of different time resources. For example, the mode and hopping pattern selection circuitry 1042 shown and described above in reference to FIG. 10 may select the hopping pattern for the scheduled entity.

At block 1206, the scheduling entity may transmit an indication of the selected mode and selected hopping pattern to the scheduled entity. In some examples, the indication may be transmitted within an RRC message or within DCI. For example, the DL traffic and control channel generation and transmission circuitry 1043 together with the transceiver 1010 shown and described above in reference to FIG. 10 may transmit the indication of the selected mode and hopping pattern to the scheduled entity.

At block 1208, the scheduling entity may receive the uplink packet from the scheduled entity based on the hopping pattern. In examples in which the hopping pattern provides a sequence of frequency resources, the scheduling entity may either blind decode over all possible frequency resources in the hopping pattern (for the HARQ transmission mode) or identify the frequency resources associated with the current time index within the hopping pattern to detect the uplink packet. In examples in which the hopping pattern provides a sequence of scrambling sequences, the scheduling entity may identify the particular scrambling sequence associated with the current time index within the hopping pattern to detect and decode the uplink pattern. For example, the UL traffic and control channel reception and processing circuitry 1044 together with the transceiver 1010 may receive the uplink packet based on the hopping pattern.

Figure 13:
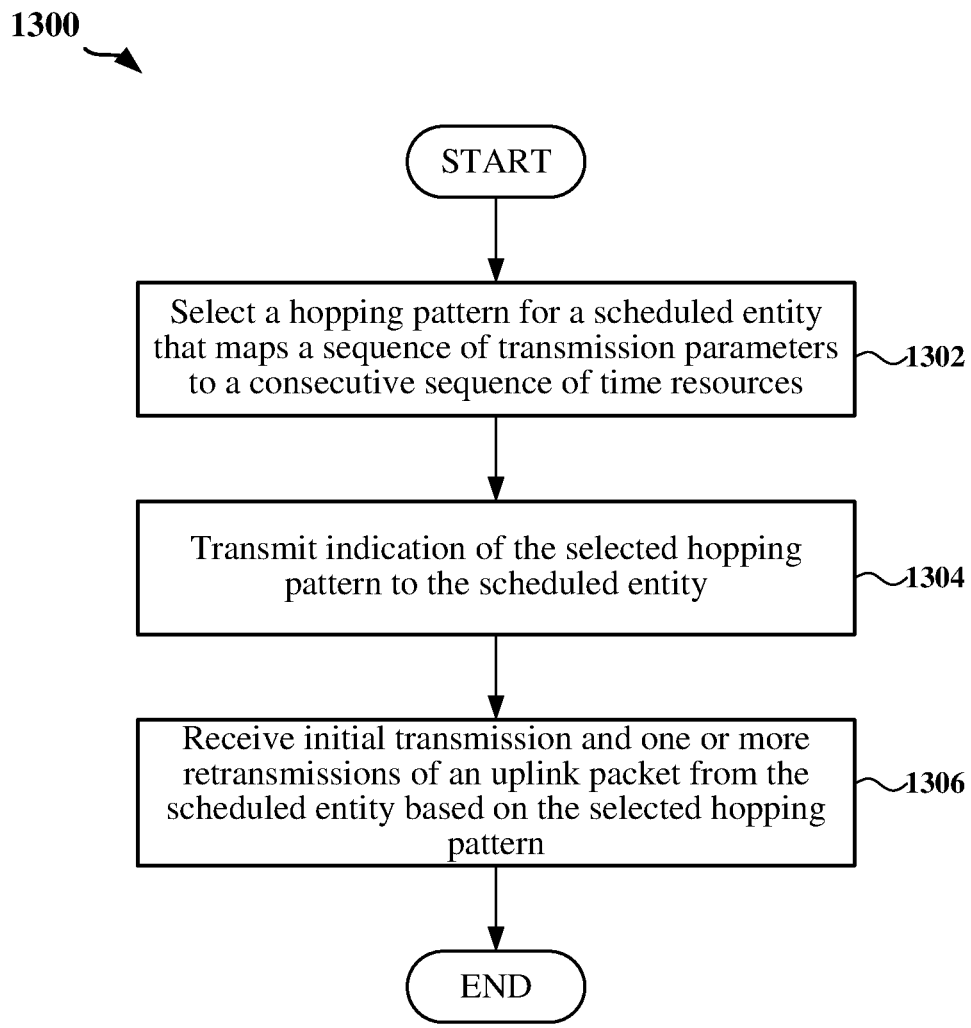
FIG. 13 is a flow chart illustrating another exemplary process for utilizing a hopping pattern for HARQ transmissions in a wireless communication network according to some aspects of the present disclosure.

FIG. 13 is a flow chart illustrating an exemplary process 1300 for utilizing a hopping pattern for HARQ transmissions in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 1000 illustrated in FIG. 10. In some examples, the process 1300 may be carried out by any suitable apparatus or means for carrying out the functions or algorithm described below.

At block 1302, the scheduling entity may select a hopping pattern from a plurality of hopping patterns for a scheduled entity to utilize for transmission of an uplink packet. Each of the hopping patterns may include a respective sequence of different transmission parameters, where each of the transmission parameters is mapped to a respective time resource within a consecutive sequence of time resources. In some examples, the sequence of different transmission parameters may include a sequence of different frequency resources. In other examples, the sequence of different transmission parameters may include a sequence of different scrambling sequences for CDMA transmissions. The hopping pattern may be selected, for example, based on at least one of the number of scheduled entities within the cell served by the scheduling entity, the traffic requirements of the scheduled entity, or processing capabilities of the scheduling entity.

In addition, each of the time resources may correspond to a symbol, a mini-slot, or a slot. In some examples, each of the time resources may be designated by a time index, where the time index indicates a time resource number (e.g., an OFDM symbol number, mini-slot number or slot number) within the consecutive sequence of time resource. For example, the hopping pattern may represent a frame and each of the time indexes may correspond to a symbol, mini-slot, or slot within the frame. For example, the mode and hopping pattern selection circuitry 1042 shown and described above in reference to FIG. 10 may select the hopping pattern for the scheduled entity.

At block 1304, the scheduling entity may transmit an indication of the selected hopping pattern to the scheduled entity. In some examples, the indication may be transmitted within an RRC message or within DCI. For example, the DL traffic and control channel generation and transmission circuitry 1043 together with the transceiver 1010 shown and described above in reference to FIG. 10 may transmit the indication of the selected mode and hopping pattern to the scheduled entity.

At block 1306, the scheduling entity may receive an initial transmission and one or more retransmissions of the uplink packet from the scheduled entity based on the hopping pattern. In examples in which the hopping pattern provides a sequence of frequency resources, the scheduling entity may identify the frequency resources associated with the current time index within the hopping pattern to detect the uplink packet. The current time index may be maintained by both the scheduling entity and the scheduled entity or transmitted from the scheduling entity to the scheduled entity. In examples in which the hopping pattern provides a sequence of scrambling sequences, the scheduling entity may identify the particular scrambling sequence associated with the current time index within the hopping pattern to detect and decode the uplink pattern. In some examples, the uplink packet may include a scheduling request, a grant-free transmission within a PUSCH, or control information within a PUCCH. For example, the UL traffic and control channel reception and processing circuitry 1044 together with the transceiver 1010 may receive the uplink packet based on the hopping pattern.

Figure 14:
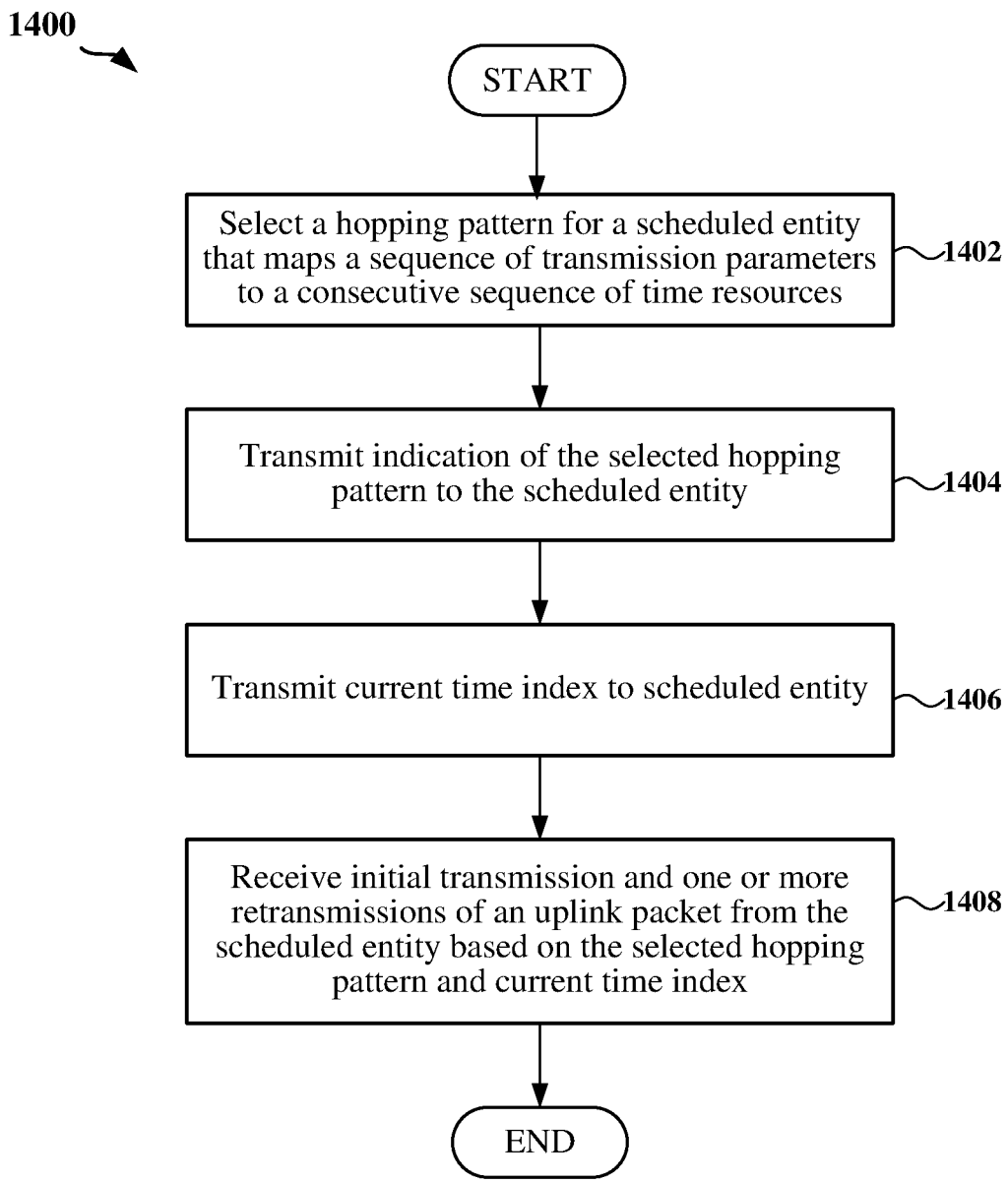
FIG. 14 is a flow chart illustrating another exemplary process for utilizing a hopping pattern for HARQ transmissions in a wireless communication network according to some aspects of the present disclosure.

FIG. 14 is a flow chart illustrating an exemplary process 1400 for utilizing a hopping pattern for HARQ transmissions in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 1000 illustrated in FIG. 10. In some examples, the process 1400 may be carried out by any suitable apparatus or means for carrying out the functions or algorithm described below.

At block 1402, the scheduling entity may select a hopping pattern from a plurality of hopping patterns for a scheduled entity to utilize for transmission of an uplink packet. Each of the hopping patterns may include a respective sequence of different transmission parameters, where each of the transmission parameters is mapped to a respective time resource within a consecutive sequence of time resources. In some examples, the sequence of different transmission parameters may include a sequence of different frequency resources. In other examples, the sequence of different transmission parameters may include a sequence of different scrambling sequences for CDMA transmissions. The hopping pattern may be selected, for example, based on at least one of the number of scheduled entities within the cell served by the scheduling entity, the traffic requirements of the scheduled entity, or processing capabilities of the scheduling entity.

In addition, each of the time resources may correspond to a symbol, a mini-slot, or a slot. In some examples, each of the time resources may be designated by a time index, where the time index indicates a time resource number (e.g., an OFDM symbol number, mini-slot number or slot number) within the consecutive sequence of time resource. For example, the hopping pattern may represent a frame and each of the time indexes may correspond to a symbol, mini-slot, or slot within the frame. For example, the mode and hopping pattern selection circuitry 1042 shown and described above in reference to FIG. 10 may select the hopping pattern for the scheduled entity.

At block 1404, the scheduling entity may transmit an indication of the selected hopping pattern to the scheduled entity. In some examples, the indication may be transmitted within an RRC message or within DCI. For example, the DL traffic and control channel generation and transmission circuitry 1043 together with the transceiver 1010 shown and described above in reference to FIG. 10 may transmit the indication of the selected mode and hopping pattern to the scheduled entity.

At block 1406, the scheduling entity may transmit a current time index to the scheduled entity, where the current time index indicates the time resource number of the current time resource (e.g., OFDM symbol, slot, or mini-slot) within a consecutive sequence of time resources forming the hopping pattern selected for the scheduled entity. In some examples, the current time index may be transmitted within downlink control information, periodically, or aperiodically. For example, the DL traffic and control channel generation and transmission circuitry 1043 together with the transceiver 1010 shown and described above in reference to FIG. 10 may transmit the current time index to the scheduled entity.

At block 1408, the scheduling entity may receive an initial transmission and one or more retransmission of the uplink packet from the scheduled entity based on the hopping pattern and current time index. In examples in which the hopping pattern provides a sequence of frequency resources, the scheduling entity may identify the frequency resources associated with the current time index of the time resource within which the uplink packet is received to detect the uplink packet. In examples in which the hopping pattern provides a sequence of scrambling sequences, the scheduling entity may identify the particular scrambling sequence associated with the current time index to detect and decode the uplink pattern. In some examples, the uplink packet may include a scheduling request, a grant-free transmission within a PUSCH, or control information within a PUCCH. For example, the UL traffic and control channel reception and processing circuitry 1044 together with the transceiver 1010 may receive the uplink packet based on the hopping pattern.

Figure 15:
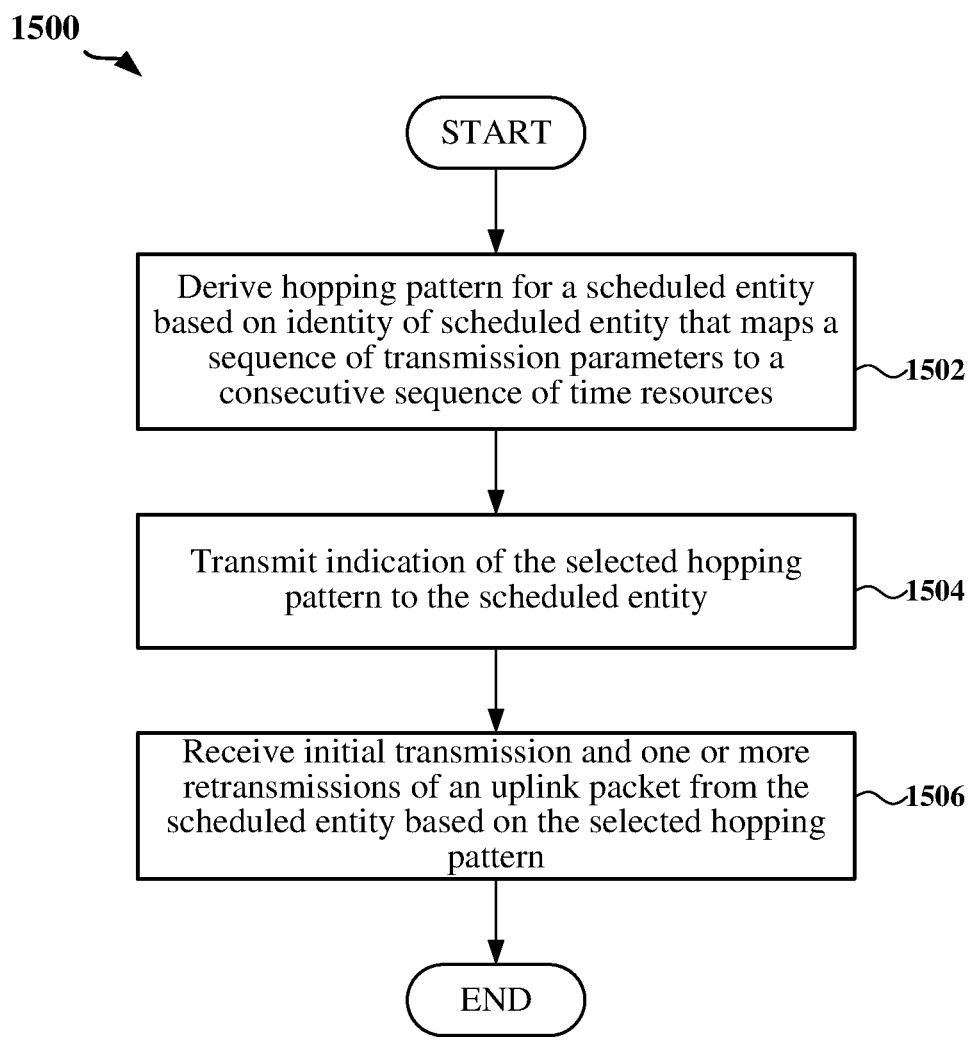
FIG. 15 is a flow chart illustrating another exemplary process for utilizing a hopping pattern for HARQ transmissions in a wireless communication network according to some aspects of the present disclosure.

FIG. 15 is a flow chart illustrating an exemplary process 1500 for utilizing a hopping pattern for HARQ transmissions in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 1000 illustrated in FIG. 10. In some examples, the process 1500 may be carried out by any suitable apparatus or means for carrying out the functions or algorithm described below.

At block 1502, the scheduling entity may derive a hopping pattern to be utilized by a scheduled entity for the transmission of an uplink packet. The hopping pattern may be derived from an identity of the scheduled entity (e.g., a UEID). The hopping pattern may further include a sequence of different transmission parameters, where each of the transmission parameters is mapped to a respective time resource within a consecutive sequence of time resources. In some examples, the sequence of different transmission parameters may include a sequence of different frequency resources. In other examples, the sequence of different transmission parameters may include a sequence of different scrambling sequences for CDMA transmissions.

In addition, each of the time resources may correspond to a symbol, a mini-slot, or a slot. In some examples, each of the time resources may be designated by a time index, where the time index indicates a time resource number (e.g., an OFDM symbol number, mini-slot number or slot number) within the consecutive sequence of time resource. For example, the hopping pattern may represent a frame and each of the time indexes may correspond to a symbol, mini-slot, or slot within the frame. For example, the mode and hopping pattern selection circuitry 1042 shown and described above in reference to FIG. 10 may select the hopping pattern for the scheduled entity.

At block 1504, the scheduling entity may transmit an indication of the selected hopping pattern to the scheduled entity. In some examples, the indication may be transmitted within an RRC message or within DCI. For example, the DL traffic and control channel generation and transmission circuitry 1043 together with the transceiver 1010 shown and described above in reference to FIG. 10 may transmit the indication of the selected mode and hopping pattern to the scheduled entity.

At block 1506, the scheduling entity may receive an initial transmission and one or more retransmissions of the uplink packet from the scheduled entity based on the hopping pattern. In examples in which the hopping pattern provides a sequence of frequency resources, the scheduling entity may identify the frequency resources associated with the current time index within the hopping pattern to detect the uplink packet. The current time index may be maintained by both the scheduling entity and the scheduled entity or transmitted from the scheduling entity to the scheduled entity. In examples in which the hopping pattern provides a sequence of scrambling sequences, the scheduling entity may identify the particular scrambling sequence associated with the current time index within the hopping pattern to detect and decode the uplink pattern. In some examples, the uplink packet may include a scheduling request, a grant-free transmission within a PUSCH, or control information within a PUCCH. For example, the UL traffic and control channel reception and processing circuitry 1044 together with the transceiver 1010 may receive the uplink packet based on the hopping pattern.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 10, and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduling entity to communicate with a set of one or more scheduled entities in a wireless communication network, the method comprising:
   selecting a hopping pattern from a plurality of hopping patterns for a scheduled entity of the set of one or more scheduled entities to utilize for transmission of an uplink packet, wherein each of the plurality of hopping patterns comprises a respective sequence of different transmission parameters, wherein each of the different transmission parameters in the sequence of different transmission parameters is mapped to a respective time resource within a consecutive sequence of time resources;
   transmitting an indication of the hopping pattern to the scheduled entity; and
   receiving an initial transmission and one or more retransmissions of the uplink packet from the scheduled entity based on the hopping pattern;
   wherein the sequence of different transmission parameters for the hopping pattern comprises one of a sequence of different frequency resources on which the uplink packet is transmitted over time or a sequence of different scrambling sequences to be utilized in scrambling the uplink packet over time.

2. The method of claim 1, wherein each time resource within the consecutive sequence of time resources comprises a symbol, a mini-slot, or a slot.

3. The method of claim 1, wherein each time resource within the consecutive sequence of time resources is designated by a respective time index of a plurality of time indexes, each indicating a time resource number within the consecutive sequence of time resources.

4. The method of claim 3, wherein the hopping pattern represents a frame and each of the plurality of time indexes corresponds to a symbol, a mini-slot, or a slot within the frame.

5. The method of claim 3, further comprising:
maintaining a current time index of the plurality of time indexes at the scheduled entity and the scheduling entity.

6. The method of claim 3, further comprising:
transmitting a current time index of the plurality of time indexes to the scheduled entity.

7. The method of claim 1, wherein selecting the hopping pattern for the scheduled entity further comprises:
deriving the hopping pattern from the plurality of hopping patterns from an identity of the scheduled entity.

8. The method of claim 1, wherein the uplink packet comprises a scheduling request, a grant-free transmission within a physical uplink shared channel, or control information within a physical uplink control channel.

9. The method of claim 1, wherein transmitting the indication of the hopping pattern to the scheduled entity further comprises:
transmitting the indication of the hopping pattern via a radio resource control (RRC) message.

10. The method of claim 1, wherein transmitting the indication of the hopping pattern to the scheduled entity further comprises:
transmitting the indication of the hopping pattern via downlink control information (DCI).

11. The method of claim 1, wherein selecting the hopping pattern further comprises:
selecting the hopping pattern based on at least one of a number of scheduled entities within a cell served by the scheduling entity, traffic requirements of the scheduled entity, or processing capabilities of the scheduling entity.

12. A scheduling entity in a wireless communication network, comprising:
a transceiver for wireless communication with a set of one or more scheduled entities;
a memory maintaining a plurality of hopping patterns; and
a processor communicatively coupled to the transceiver and the memory, the processor and the memory configured to:
select a hopping pattern from the plurality of hopping patterns for a scheduled entity of the set of one or more scheduled entities to utilize for transmission of an uplink packet, wherein each of the plurality of hopping patterns comprises a respective sequence of different transmission parameters, wherein each of the different transmission parameters in the sequence of different transmission parameters is mapped to a respective time resource within a consecutive sequence of time resources;
transmit an indication of the hopping pattern to the scheduled entity via the transceiver; and
receive an initial transmission and one or more retransmissions of the uplink packet from the scheduled entity based on the hopping pattern via the transceiver;
wherein the sequence of different transmission parameters for the hopping pattern comprises one of a sequence of different frequency resources on which the uplink packet is transmitted over time or a sequence of different scrambling sequences to be utilized in scrambling the uplink packet over time.

13. The scheduling entity of claim 12, wherein each of time resource within the consecutive sequence of time resources comprises a symbol, a mini-slot, or a slot.

14. The scheduling entity of claim 12, wherein each of time resource within the consecutive sequence of time resources is designated by a respective time index of a plurality of time indexes, each indicating a time resource number within the consecutive sequence of time resources.

15. The scheduling entity of claim 14, wherein the hopping pattern represents a frame and each of the plurality of time indexes corresponds to a symbol, a mini-slot, or a slot within the frame.

16. The scheduling entity of claim 14, wherein the processor and the memory are further configured to:
maintain a current time index of the plurality of time indexes at the scheduled entity and the scheduling entity.

17. The scheduling entity of claim 14, wherein the processor and the memory are further configured to:
transmit a current time index of the plurality of time indexes to the scheduled entity.

18. The scheduling entity of claim 12, wherein the processor and the memory are further configured to:
derive the hopping pattern from the plurality of hopping patterns from an identity of the scheduled entity.

19. The scheduling entity of claim 12, wherein the uplink packet comprises a scheduling request, a grant-free transmission within a physical uplink shared channel, or control information within a physical uplink control channel.

20. The scheduling entity of claim 12, wherein the processor and the memory are further configured to:
transmit the indication of the hopping pattern via a radio resource control (RRC) message.

21. The scheduling entity of claim 12, wherein the processor and the memory are further configured to:
transmit the indication of the hopping pattern via downlink control information (DCI).

22. The scheduling entity of claim 12, wherein the processor and the memory are further configured to:
select the hopping pattern based on at least one of a number of scheduled entities within a cell served by the scheduling entity, traffic requirements of the scheduled entity, or processing capabilities of the scheduling entity.

23. A scheduling entity for communicating with a set of one or more scheduled entities in a wireless communication network, comprising:
means for selecting a hopping pattern from a plurality of hopping patterns for a scheduled entity of the set of one or more scheduled entities to utilize for transmission of an uplink packet, wherein each of the plurality of hopping patterns comprises a respective sequence of different transmission parameters, wherein each of the different transmission parameters in the sequence of different transmission parameters is mapped to a respective time resource within a consecutive sequence of time resources;

means for transmitting an indication of the hopping pattern to the scheduled entity; and means for receiving an initial transmission and one or more retransmissions of the uplink packet from the scheduled entity based on the hopping pattern;

wherein the sequence of different transmission parameters for the hopping pattern comprises one of a sequence of different frequency resources on which the uplink packet is transmitted over time or a sequence of different scrambling sequences to be utilized in scrambling the uplink packet over time.

24. The scheduling entity of claim 23, wherein each time resource within the consecutive sequence of time resources comprises a symbol, a mini-slot, or a slot.

25. The scheduling entity of claim 23, wherein each time resource within the consecutive sequence of time resources is designated by a respective time index of a plurality of time indexes, each indicating a time resource number within the consecutive sequence of the time resources.

26. The scheduling entity of claim 25, wherein the hopping pattern represents a frame and each of the plurality of time indexes corresponds to a symbol, a mini-slot, or a slot within the frame.

27. The scheduling entity of claim 25, further comprising:

means for maintaining a current time index of the plurality of time indexes at the scheduled entity and the scheduling entity.

28. The scheduling entity of claim 25, further comprising:

means for transmitting a current time index of the plurality of time indexes to the scheduled entity.

29. The scheduling entity of claim 23, wherein the means for selecting the hopping pattern for the scheduled entity further comprises:

means for deriving the hopping pattern from the plurality of hopping patterns from an identity of the scheduled entity.

30. The scheduling entity of claim 23, wherein the uplink packet comprises a scheduling request, a grant-free transmission within a physical uplink shared channel, or control information within a physical uplink control channel.

31. The scheduling entity of claim 23, wherein the means for transmitting the indication of the hopping pattern to the scheduled entity further comprises:

means for transmitting the indication of the hopping pattern via a radio resource control (RRC) message.

32. The scheduling entity of claim 23, wherein the means for transmitting the indication of the hopping pattern to the scheduled entity further comprises:

means for transmitting the indication of the hopping pattern via downlink control information (DCI).

33. The scheduling entity of claim 23, wherein the means for selecting the hopping pattern further comprises:

means for selecting the hopping pattern based on at least one of a number of scheduled entities within a cell served by the scheduling entity, traffic requirements of the scheduled entity, or processing capabilities of the scheduling entity.

34. A non-transitory computer-readable medium storing computer executable code, comprising code for causing a scheduling entity in a wireless communication network to:

select a hopping pattern from a plurality of hopping patterns for a scheduled entity of a set of one or more scheduled entities to utilize for transmission of an uplink packet, wherein each of the plurality of hopping patterns comprises a respective sequence of different transmission parameters, wherein each of the different transmission parameters in the sequence of different transmission parameters is mapped to a respective time resource within a consecutive sequence of time resources;

transmit an indication of the hopping pattern to the scheduled entity; and receive an initial transmission and one or more retransmissions of the uplink packet from the scheduled entity based on the hopping pattern;

wherein the sequence of different transmission parameters for the hopping pattern comprises one of a sequence of different frequency resources on which the uplink packet is transmitted over time or a sequence of different scrambling sequences to be utilized in scrambling the uplink packet over time.

35. The non-transitory computer-readable medium of claim 34, wherein each time resource within the consecutive sequence of time resources comprises a symbol, a mini-slot, or a slot.

36. The non-transitory computer-readable medium of claim 34, wherein each time resource within the consecutive sequence of time resources is designated by a respective time index of a plurality of time indexes, each indicating a time resource number within the consecutive sequence of the time resources.

37. The non-transitory computer-readable medium of claim 36, wherein the hopping pattern represents a frame and each of the plurality of time indexes corresponds to a symbol, a mini-slot, or a slot within the frame.

38. The non-transitory computer-readable medium of claim 36, further comprising code for causing the scheduling entity to:

maintain a current time index of the plurality of time indexes at the scheduled entity and the scheduling entity.

39. The non-transitory computer-readable medium of claim 36, further comprising code for causing the scheduling entity to:

transmit a current time index of the plurality of time indexes to the scheduled entity.

40. The non-transitory computer-readable medium of claim 34, further comprising code for causing the scheduling entity to:

derive the hopping pattern from the plurality of hopping patterns from an identity of the scheduled entity.

41. The non-transitory computer-readable medium of claim 34, wherein the uplink packet comprises a scheduling request, a grant-free transmission within a physical uplink shared channel, or control information within a physical uplink control channel.

42. The non-transitory computer-readable medium of claim 34, further comprising code for causing the scheduling entity to:

transmit the indication of the hopping pattern via a radio resource control (RRC) message.

43. The non-transitory computer-readable medium of claim 34, further comprising code for causing the scheduling entity to:

transmit the indication of the hopping pattern via downlink control information (DCI).

44. The non-transitory computer-readable medium of claim 34, further comprising code for causing the scheduling entity to:

select the hopping pattern based on at least one of a number of scheduled entities within a cell served by a scheduling entity, traffic requirements of the scheduled entity, or processing capabilities of the scheduling entity.

\* \* \* \* \*